(12) United States Patent
Broms et al.

(10) Patent No.: US 7,444,300 B1
(45) Date of Patent: Oct. 28, 2008

(54) METHOD AND SYSTEM FOR IMPROVED FUND INVESTMENT AND TRADING PROCESSES

(75) Inventors: Todd J Broms, New York, NY (US); Gary L. Gastineau, Short Hills, NJ (US)

(73) Assignee: Managed ETFs LLC, Summit, NJ (US)

( * ) Notice: Subject to any disclaimer, the term of this patent is extended or adjusted under 35 U.S.C. 154(b) by 378 days.

(21) Appl. No.: 11/141,243

(22) Filed: May 31, 2005

Related U.S. Application Data

(60) Provisional application No. 60/635,670, filed on Dec. 13, 2004.

(51) Int. Cl.
*G06Q 40/00* (2006.01)

(52) U.S. Cl. ............... 705/35; 705/36 R; 705/37

(58) Field of Classification Search ......... 705/35–45; 708/105, 110, 163; 434/107
See application file for complete search history.

(56) References Cited

U.S. PATENT DOCUMENTS

| | | | |
|---|---|---|---|
| 5,806,048 A | 9/1998 | Kiron et al. | |
| 5,845,266 A | 12/1998 | Lupien et al. | |
| 6,012,046 A | 1/2000 | Lupien et al. | |
| 6,029,146 A | 2/2000 | Hawkins et al. | |
| 6,098,051 A | 8/2000 | Lupien et al. | |
| 6,236,972 B1 | 5/2001 | Shkedy | |
| 6,418,419 B1 | 7/2002 | Nieboer et al. | |
| 6,879,964 B2 | 4/2005 | Sauter et al. | |
| 6,941,280 B1 * | 9/2005 | Gastineau et al. | 705/36 R |
| 7,024,387 B1 | 4/2006 | Nieboer et al. | |
| 7,099,838 B1 | 8/2006 | Gastineau et al. | |
| 2001/0025266 A1 | 9/2001 | Gastineau et al. | |
| 2002/0128947 A1 * | 9/2002 | Sauter et al. | 705/37 |
| 2002/0194107 A1 | 12/2002 | Li et al. | |
| 2003/0177077 A1 * | 9/2003 | Norman | 705/35 |
| 2003/0177086 A1 | 9/2003 | Gomber et al. | |
| 2003/0177126 A1 | 9/2003 | Weingard et al. | |
| 2003/0233302 A1 | 12/2003 | Weber et al. | |

(Continued)

OTHER PUBLICATIONS

Sydney LeBlanc's article Did You Know Them?, published On Wall Street, Oct. 1, 2004, p. 1.*

(Continued)

*Primary Examiner*—Mary Cheung
*Assistant Examiner*—Brian Fertig
(74) *Attorney, Agent, or Firm*—Sterne, Kessler, Goldstein & Foxx PLLC

(57) ABSTRACT

Systems and methods are disclosed for managing and trading an investment fund having a portfolio including any combination of financial instruments and cash and having a general class of fund shares tradable in a secondary market. In the disclosed processes, assets enter and are removed from the investment fund through an exchange-traded fund share creation and redemption process governed by a set of rules. An intra-day fund share net asset value proxy based on a fund portfolio is distributed through electronic quotation vendors during the trading day at a specified interval. Notices of intention to create or redeem shares of the redeemable share class received by a specified time result in implementing the creation or redemption of shares at a net asset value determined after the notices are received. These features protect ongoing investors in the fund from costs of fund share trading by entering and leaving shareholders.

50 Claims, 10 Drawing Sheets

U.S. PATENT DOCUMENTS

| | | | |
|---|---|---|---|
| 2004/0186803 A1 | 9/2004 | Weber et al. | |
| 2004/0210502 A1* | 10/2004 | Madhavan et al. | 705/36 |
| 2004/0236636 A1 | 11/2004 | Lutnick et al. | |
| 2004/0243502 A1 | 12/2004 | Slowik et al. | |
| 2005/0262010 A1* | 11/2005 | Tull et al. | 705/37 |
| 2006/0026091 A1 | 2/2006 | Keen et al. | |
| 2006/0100955 A1* | 5/2006 | Baldassini et al. | 705/37 |
| 2006/0167786 A1* | 7/2006 | Gambir et al. | 705/37 |
| 2007/0027790 A1 | 2/2007 | Gastineau et al. | |

OTHER PUBLICATIONS

Berk, Jonathan B. and Richard C. Green, "Mutual Fund Flows and Performance in Rational Markets," *Journal of Political Economy*, vol. 112, No. 6, Dec. 2004, pp. 1269-1295, http://www.journals.uchicago.edu/JPE/journal/contents/v112n6.html An earlier version (Dec. 2002) was published as an NBER working paper http://papers.ssrn.com/sol3/papers.cfm?abstract_id=338881.

Bernstein Peter, "What's It All About, Alpha?", *Institutional Investor*, May 2004, pp. 48-52.

Chen, Joseph, Harrison Hong, Ming Huang and Jeffrey Kubik, "Does Fund Size Erode Performance? Liquidity, Organizational Diseconomies and Active Money Management," Working Paper, Sep. 2002 and May 2004 (forthcoming in the *American Economic Review*) http://www-rcf.usc.edu/~josephsc/files/fundsize.pdf.

Clark, Andrew, "For Benchmark-Beating Funds, Does Fund Size Affect Performance?", Lipper Research Study, Jan. 5, 2004 http://www.research.lipper.wallst.com/researchStudiesOverview.asp.

Edelen, Roger M., "Investor Flows and the Assessed Performance of Open-End Mutual Funds," *Journal of Financial Economics* 53, 1999, pp. 439-466.

Gastineau, Gary L., *The Exchange-Traded Funds Manual*, 2002b, John Wiley & Sons.

Gastineau, Gary L., "Protecting Fund Shareholders From Costly Share Trading," *Financial Analysts Journal*, May/Jun. 2004a, pp. 22-32. http://www.etfconsultants.com/Protecting%20Fund%20Shareholders%20FAJ.pdf.

Gastineau, Gary L. and Craig J. Lazzara, "Reinventing the Investment Fund" from *The Investment Think Tank: Theory, Strategy, and Practice for Advisers*, Harold Evensky and Deena Katz, editors, Bloomberg Press, 2004, pp. 153-178. Also appeared in *Bloomberg Wealth Manager* under the title of "Extreme Makeover," Nov. 2004, pp. 57-68.

Greene, Jason T., and Charles W. Hodges, "The Dilution Impact of Daily Fund Flows on Open-End Mutual Funds." *Journal of Financial Economics*, vol. 65, No. 1, Jul. 2002, pp. 131-158.

Johnson, Woodrow T., "Predictable Investment Horizons and Wealth Transfers among Mutual Fund Shareholders," *Journal of Finance*, Oct. 2004, pp. 1979-2012.

Porter, Michael, "The Future Is Now: The AMEX's Solution To The Active ETF Riddle," Lipper Fund Industry Insight Reports, Dec. 6, 2004, http://www.research.lipper.wallst.com/fundIndustryOverview.asp, ($15 payment required to view article).

Porter, Michael, "Gary Gastineau on Why Actively-Managed Exchange-Traded Funds Can Be The Greatest Thing Since Money Market Funds," Lipper Fund Industry Insight Reports, Nov. 30, 2004, http://www.research.lipper.wallst.com/fundIndustryOverview.asp, (%15 payment required to view article).

Securities and Exchange Commission, Concept Release Actively-Managed Exchange-Traded Funds, 17 CFR Part 270, [Release No. IC-25258; File No. S7-20-01], http://www.sec.gov/rules/concept/ic-25258.htm.

Securities and Exchange Commission, Comments on Concept Release Actively-Managed Exchange-Traded Funds, 17 CFR Part 270, [Release No. IC-25258; File No. S7-20-01], http://www.sec.gov/rules/concept/s72001.shtml.

Comments of Paul Charbonnet, Investors FastTrack, Baton Rouge, La., Dec. 12, 2002 http://www.sec.gov/rules/concept/s72001/pcharbonnet1.txt).

Comment of Pascal Redding, Jun. 6, 2002 http://www.sec.gov/rules/concept/s72001/predding1.txt.

Comments of John White, May 4, 2002 http://www.sec.gov/rules/concept/s72001/white1.txt.

Comments of R. Sheldon Johnson, Managing Director, Morgan Stanley & Co. Incorporated, May 3, 2002 http://www.sec.gov/rules/concept/s72001/johnson1.htm.

Comments of Charles M. Bartlett Jr., May 2, 2002 http://www.sec.gov/rules/concept/s72001/bartlett1.txt.

Comments of Michael J. Ryan, Jr., Executive Vice President and General Counsel, The American Stock Exchange, LLC, Mar. 5, 2002 http://www.sec.gov/rules/concept/s72001/ryan1.htm.

Comments of Stanley Keller, Chair, Committee on Federal Regulation of Securities; Diane E. Ambler, Chair, and Jay G. Baris, Vice-Chair, Subcommittee on Investment Companies and Investment Advisers, Section of Business Law of the American Bar Association, Feb. 1, 2002 http://www.sec.gov/rules/concept/s72001/keller1.htm.

Comments of Robert M. Steele, Executive Vice President, Rydex Global Advisors Inc., Jan. 31, 2002 http://www.sec.gov/rules/concept/s72001/steele1.htm.

Comments of Mike Schoren, Jan. 20, 2002 http://www.sec.gov/rules/concept/s72001/schoren1.txt.

Comments of Gary L. Gastineau, Managing Director, Nuveen Investments, Jan. 14, 2002 http://www.sec.gov/rules/concept/s72001/gastineau1.htm.

Comments of Joel Greenberg, Managing Director, Susquehanna International Group, Jan. 14, 2002 http://www.sec.gov/rules/concept/s72001/greenberg1.htm.

Comments of Austin J. Fleites, Principal, State Street Bank and Trust Company, Jan. 14, 2002 http://www.sec.gov/rules/concept/s72001/fleites1.htm.

Comments of Richard F. Morris, Senior Counsel, Barclays Global Investors, Jan. 11, 2002 http;//www.sec.gov/rules/concept/s72001/morris1.htm.

Comments of Ivar Bjornstad, President, Shoreland Partners LLC, Jan. 11, 2002 http://www.sec.gov/rules/concept/s72001/bjornstad1.htm.

Comments of Kriya Inc., Jan. 8, 2002 http://www.sec.gov/rules/concept/s72001/kriya1.htm.

Comments of Stacy W. Goff, Vice President and Assistant General Counsel, CenturyTel, Inc., Jan. 7, 2002 http://www.sec.gov/rules/concept/s72001/goff1.htm.

Stein, Jeremy C., "Why Are Most Funds Open-End? Competition and the Limits of Arbitrage," Working Paper, Jan. 2004, Harvard University, http://post.economics.harvard.edu/faculty/stein/papers/OpenEndJan04revision.pdf.

Barney, Lee, "Actively Managed ETFs: Coming Soon to an Exchange Near You?", The Street, May 24, 2001, 4 pgs. (http://www.thestreet.com/funds/funds/1440520.html).

"Trading Strategies" Turbo Trade, http://www.turbotrade.com/content/view/116/94.

Hakim, Danny, "The Markets: Market Place; Two reports see exchange-traded funds as a logical extension for mutual fund companies", The New York Times, Jul. 27, 2000, 2 pgs.

Gastineau, Gary L., "Reinventing the Mutual Fund: An Essential Piece of Financial Engineering", ETF Consultants, Feb. 25, 2005, 32 pgs.

* cited by examiner

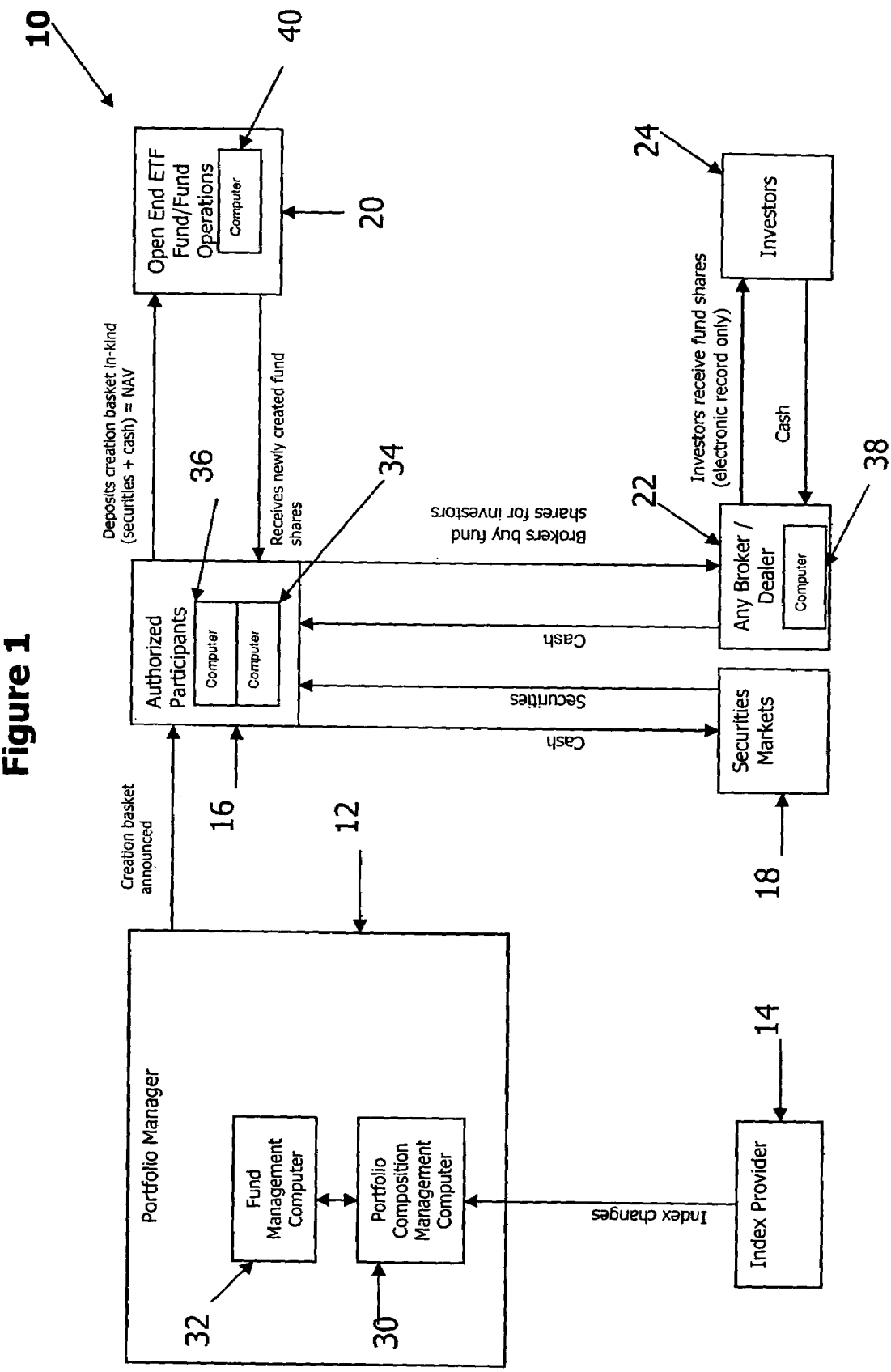

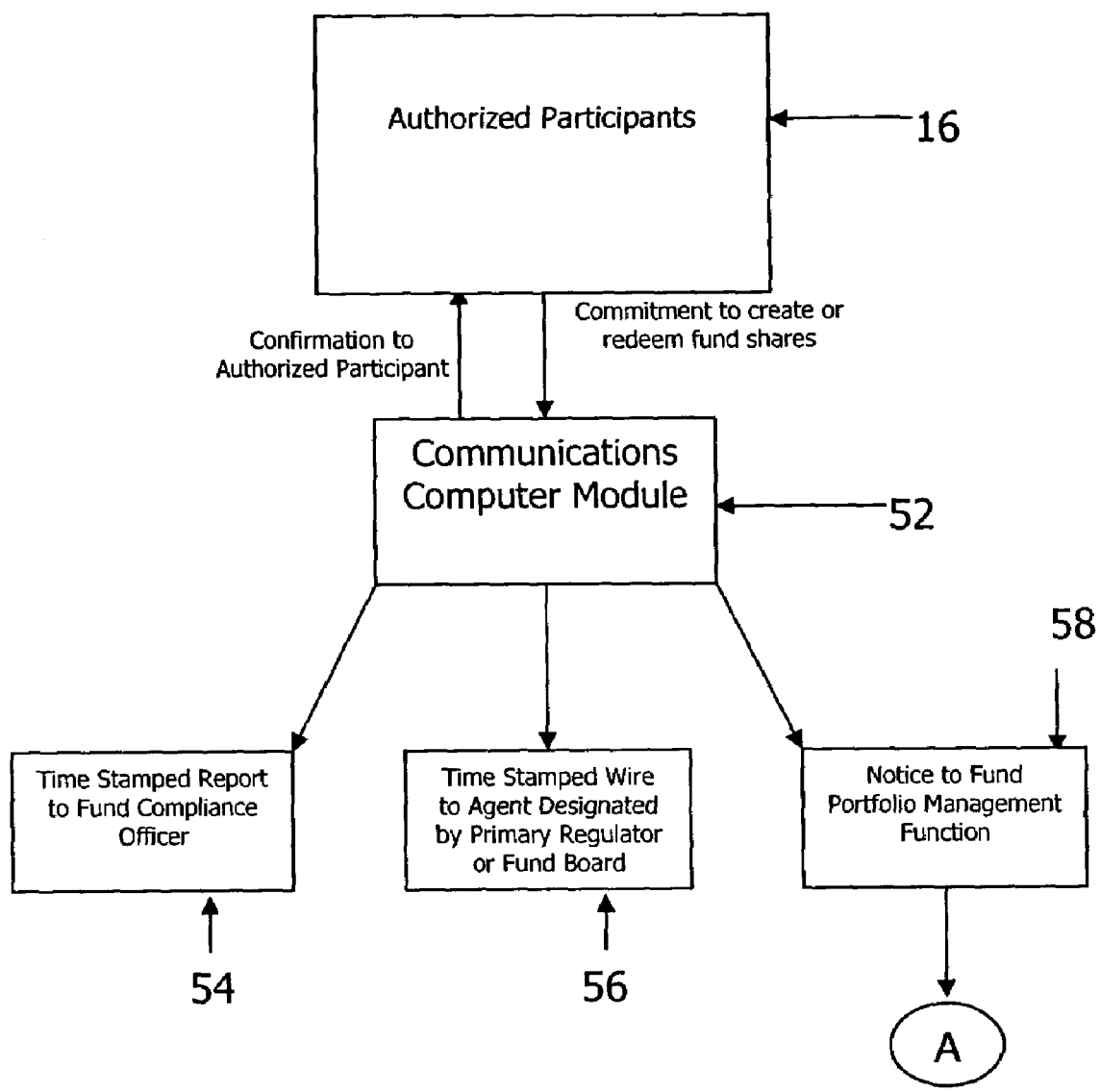

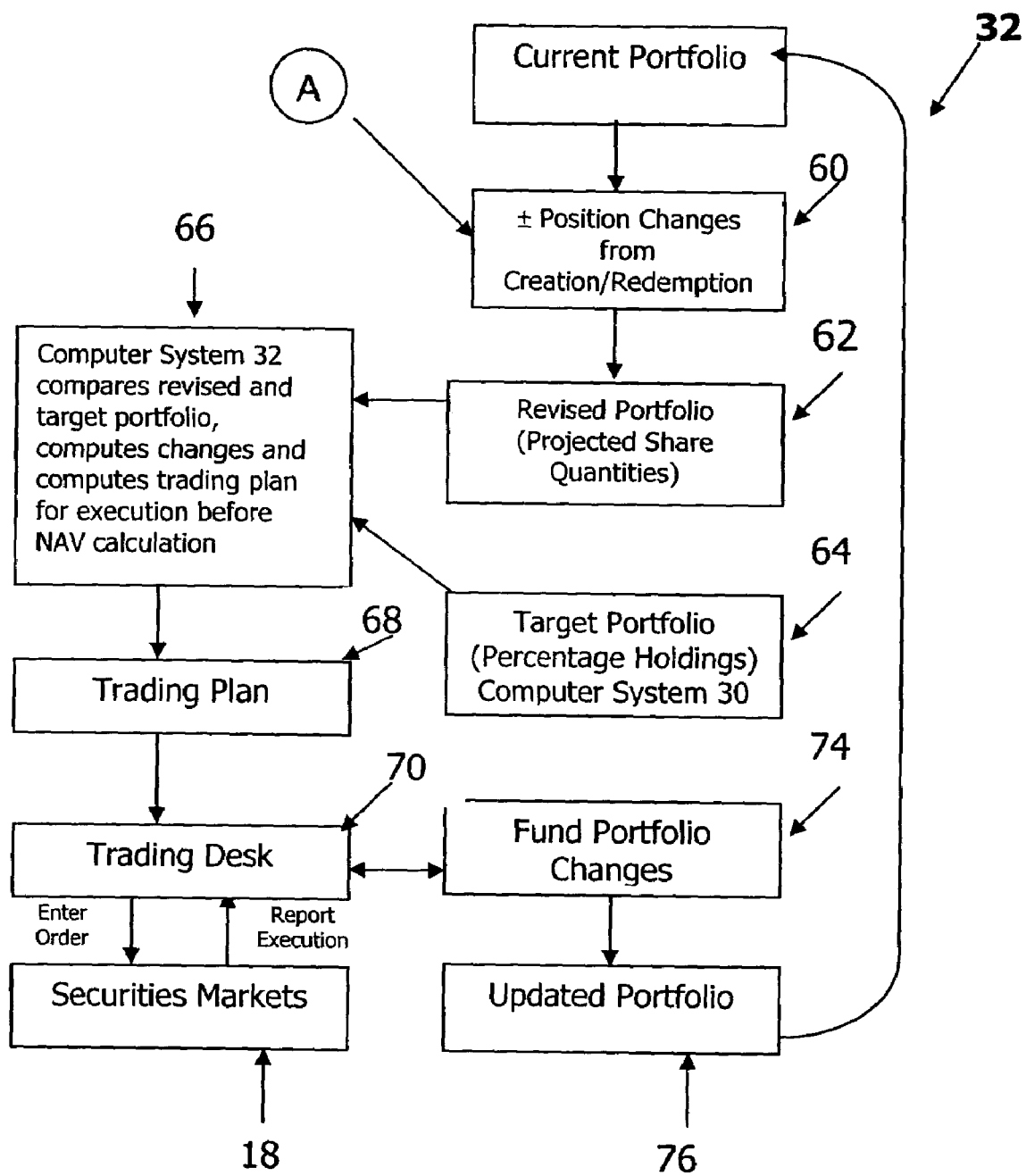

METHOD AND SYSTEM FOR IMPROVED FUND INVESTMENT AND TRADING PROCESSES

RELATED APPLICATIONS

This application claims priority from Provisional Application Ser. No. 60/635,670 filed Dec. 13, 2004 by the same inventors. The contents of that application are hereby incorporated by reference.

FIELD OF INVENTION

In 1993, The American Stock Exchange ("AMEX") created the first ETF in the United States, SPDR ("SPY"), Standard & Poor's Depositary Receipts which represent ownership in the SPDR Trust Series 1, a unit investment trust holding the stocks in the Standard & Poor's 500 Composite Stock Price Index. Two other well known examples of ETFs also structured as unit investment trusts are: (i) Diamonds ("DIA"), Diamonds Trust Series 1 holding the equity securities included in the Dow Jones Industrial Average, and (ii) the Nasdaq 100 Index Tracking Stock ("QQQQ") which represents ownership in the Nasdaq 100 Trust holding the equity securities included in the Nasdaq 100 Index. Most other ETFs are organized as management investment companies with a structure and governance mechanism patterned after traditional mutual funds. All ETFs currently traded in the United States are designed and intended to provide investment results that, before expenses, generally correspond to the price and dividend yield performance of their respective index.

ETFs were originally established for investors to trade and hold diversified portfolios of marketable securities (stocks and/or fixed income securities) generally structured to correspond to a specific market index covering broad or narrow segments of a stock or bond market. Approximately 150 indexed ETFs were traded in the United States at the end of 2004.

Unlike open-end mutual funds and like all publicly traded stocks, ETF shares are structured to trade intra-day with the ease and liquidity of a share of stock, giving investors ownership of a portfolio through one security and the ability to purchase fund shares on margin and to sell them short. Currently available ETFs are generally low-cost funds because they are based on an index, and are not charged active management fees. The Securities and Exchange Commission ("SEC") has not yet allowed ETFs to be "actively managed," but has issued a Concept Release (SEC Release No. 1C-25258, Nov. 8, 2001, Actively-Managed Exchange-Traded Funds) and otherwise indicated a willingness to consider applications to issue such funds.

Pursuant to SEC exemptive orders, the currently available ETFs do not sell individual fund shares directly to investors as mutual funds do. In the generalized ETF creation and redemption process as described herein, ETFs issue and redeem their shares only in blocks (50,000 fund shares in the case of the SPY, for example) that are known as "Creation Units." The creation and redemption of ETF shares is done primarily by authorized participants (broker-dealers that have executed agreements with a fund's agents to create and redeem fund shares). Although a few funds authorize all cash creations and/or redemptions, authorized participants generally do not purchase or redeem Creation Units entirely for cash, but rather buy or sell Creation Units by delivering or receiving a basket of securities (plus or minus cash) that generally mirrors the portfolio of the ETF in a transaction facilitated by the fund's custodian and/or transfer agent. The authorized participants who purchase and redeem ETF Creation Units are predominantly market makers in the fund shares. After purchasing a Creation Unit, the authorized participant often splits it up and sells the individual shares on the secondary market, permitting other investors to trade in lots as small as an individual share.

Investors who want to sell their ETF shares have two options: (1) they can sell individual shares to other investors on the secondary market, or (2) they can sell Creation Units back to the ETF. ETFs generally redeem Creation Units in-kind by giving investors securities from the fund portfolio instead of cash. For example, the DIA ETF invested in the stocks in the Dow Jones Industrial Average (DJIA) would pay a redeeming shareholder by delivering some or all of the securities that constitute the DJIA. At its discretion, the fund may substitute cash for some or all of the securities in a creation or redemption transaction. To prevent investor confusion and because the redeemability of ETF shares is limited to Creation Units, ETFs may not call themselves mutual funds.

Mutual funds and ETFs are regulated primarily under the Investment Company Act of 1940, but are also subject to significant regulation under the Securities Act of 1933 and the Securities Exchange Act of 1934.

Unlike the ETFs available today, mutual funds are frequently actively managed. Like ETFs, mutual funds pool capital from many investors and invest in stocks, bonds, short-term money-market instruments, and other securities. Traditional and distinguishing characteristics of mutual funds are: (i) mutual fund shares are purchased by investors for cash, directly or through a broker or other intermediary, or from the fund itself, rather than from other investors or market makers on a secondary market; (ii) the purchase price that investors pay for mutual fund shares is often the fund's per share net asset value (NAV); (iii) shareholder fees that the fund imposes at purchase (such as sales loads) may or may not be charged; (iv) mutual fund shares are usually redeemed at NAV for cash by the fund at the time of sale by the investor rather than being sold through and into the secondary market; (v) mutual funds generally sell and redeem their shares daily without limit, although some funds will stop selling new shares when they become large; and (vi) mutual fund operations and portfolios typically are managed by management companies known as investment advisers that are registered with the SEC.

Investment advisers receive management fees for managing the portfolio and operating the mutual fund. Some funds may also have sales charges or loads imposed in connection with a fund share sale or redemption or charges for distribution and service costs, commonly levied as 12b-1 fees, may be collected annually by the fund manager. Additionally, a mutual fund may offer different classes of shares with each class having different fees and expenses.

Early in September 2003, New York State's attorney general, Eliot Spitzer, announced a $40 million settlement with a hedge fund that had allegedly engaged in "late trading" and "market timing" with mutual funds. Late trading allegedly involved the hedge fund being permitted to buy and sell fund shares at the fund's 4:00 p.m. net asset value (NAV) several hours after the prices used in the NAV calculation were determined—a violation of U.S. SEC Rule 22c-1. Distinct from the transactions at "backward" prices were a number of market-timing trades initiated at or slightly before 4:00 p.m. In some cases, these trades may have taken advantage of "stale" prices in foreign or illiquid markets. In many cases, the market-timing trades created a need for the fund to trade during the following day's trading session. Any market impact cost of the next-day trades was borne by all the fund's shareholders.

There is strong evidence, apart from the recent publicity, that fund share orders coming to a fund late in the day is a common practice. These orders come from investors with motives far more diverse than market timing over a few days.

Since the Spitzer settlement called attention to these practices, the emphasis of most regulators and pundits has been on developing regulations to prevent improper trades based on stale prices or executed in violation of prospectus prohibitions against market timing. The problem with adding new regulations is that the abuses cited are possible only because the standard mutual fund pricing and trading processes are inherently flawed.

Most fund share trades that arrive late in the day are costly to existing fund shareholders no matter whether they were initiated by short-term traders or by ordinary investors. The cost to shareholders of fund orders entered at or just before the market close has been estimated as high as $40 billion a year. Orders the fund does not receive by early afternoon cost fund shareholders much more than simply the profits that some traders take away.

Last-minute fund buy orders frequently arrive on days when the market is strong near the close. Because orders to be executed at the market-on-close must be entered earlier, investors cannot buy the separate stock positions held by a typical equity fund at 4:00 p.m. closing prices by entering stock buy orders at 3:59 p.m. The investor can, however, buy shares in most funds a few seconds before 4:00 p.m. Just as an investor cannot execute stock trades at closing prices right before the NAV calculation, the fund cannot make an immediate trade for its portfolio at closing prices to invest the new cash. Whether they intend to get in and out quickly or to stay for years, many buyers of fund shares make last-minute purchases on days with a strong market at the close. If these buyers capture market momentum, their trades are particularly costly to their fellow fund shareholders because the fund will have to buy stocks at even higher prices on the next trading day to invest the cash inflow. Correspondingly, if a shareholder redeems fund shares with an order entered near 4:00 p.m., the fund will have to sell portfolio securities the next trading day, often at lower prices, to cover the redemption. The fund is thus providing free liquidity to these investors, and the fund's shareholders pay the cost of that liquidity. The cost of providing this liquidity is a permanent drag on the performance of the fund. It does not go away, even if the investor stays in the fund for many years. The net effect of the limited regulatory changes proposed in the wake of the scandals is to slightly reduce the nominal level of shareholder protection from the cost of late afternoon orders, offering false comfort to investors.

Studies of the impact of fund share trading offer compelling evidence that the costs to ongoing (non-trading) shareholders of providing free liquidity to trading shareholders are substantial. Roger M. Edelen (1999), then a professor at the Wharton School at the University of Pennsylvania, quantified the adverse effect of shareholder entry and exit costs on fund performance. Using a sample of 166 conventional (no-load) mutual funds ranging in type from small-capitalization to income funds, Edelen examined all purchases and sales of securities by the funds over a series of six-month periods. The six-month interval was determined by the reporting interval for mutual funds at the time of the study. Edelen broke down each fund's trading into flow (fund share turnover) and non-flow (portfolio composition changes) components. He measured how much of the flow-related trading was incremental trading resulting from the need to purchase and sell portfolio securities in response to the entry and exit of shareholders. His methodology revealed the cost of this trading, not the motives of the buying and selling shareholders. Edelen did not attribute a performance cost to flow trading if the manager was able to use the flow to make desired portfolio changes. He concluded that for the average fund in his sample, 30 percent of the flow into and out of the fund did not result in incremental trading and about half of the fund's total trading was flow related.

If 70 percent of flow resulted in incremental trading, then about 35 percent of total fund trading was incremental trading that resulted from providing liquidity to entering and leaving shareholders. The average fund Edelen studied was clearly not used aggressively by fund traders; aggressive trade timing can easily cause a rate of annual fund share turnover of several hundred percent. The modest flow and fund share turnover in Edelen's sample notwithstanding, the trading costs he attributed to the liquidity offered to entering and exiting shareholders accounted for an average net reduction in annual investor return of about 1.43 percent.

The 1.43 percent cost of providing liquidity to buyers and sellers of fund shares easily justifies a $40 billion annual minimum estimated performance cost of late-afternoon fund share orders. Recent figures show assets in U.S. stock and hybrid funds at about $4 trillion. Applying a conservative cost of providing liquidity of just 1 percent annually produces a $40 billion estimate of the cost/performance penalty that this feature of mutual funds costs the funds' shareholders.

Another problem with existing funds is the fact that most sizeable investment-management organizations offer a wide variety of products to investors. These investment products are theoretically managed independently because each portfolio is independent in composition. However, funds and other products with the same advisor are often managed under a common investment process and hold numerous securities in common. Furthermore, the investment manager has a responsibility to the beneficial holders of each portfolio or "separately managed" product to treat them fairly, when management of the products is partly integrated. Thus, when the firm embarks upon the purchase of a particular security or group of securities, the securities are often purchased for many or maybe even all of the manager's accounts or funds at about the same time. To manage conflicts of interest, many investment management organizations have developed techniques to handle purchases and sales for different accounts in a random sequence or rotation. The rotation is designed to assure that a particular account or group of accounts comes first on the list for some investment changes, in the middle for others and, inevitably, at the bottom of the list for still others. If the investment management organization has a trading desk that handles trades for all of the manager's accounts, the desk may calculate an average price and give each account the same average price with all accounts participating in trades over a longer period. The problem with these procedures is that each type of account that might hold a specific position has characteristics that cause its trading practices to reveal different amounts and kinds of information, almost at random, to other market participants while the trading moves through account categories or trades are allocated to all accounts over a period of a few weeks. An investment manager that manages only funds registered under the Investment Company Act of 1940 can preserve the value of investment information better than a manager that has a diverse product line.

Mediocre performance by most mutual funds has been attributed in part to a fund management incentive structure that encourages funds to accept all assets offered to them by potential shareholders. A management process capable of delivering superior performance for a small fund is often swamped with assets after a brief period of good performance. The manager makes more with a larger asset base, but shareholder performance is diluted by asset growth. Both shareholders and fund managers might benefit from a fund structure that caps asset growth and pays higher fees for managers that deliver superior results.

Although mutual funds are used by many investors including individuals, institutions, endowment funds, qualified retirement plans and others, mutual funds and their typical investment process are not generally designed to: (i) offer investors inherent protection from most of the abuses uncovered in the recent mutual fund trading scandals; (ii) minimize investor costs from fund share and portfolio turnover; (iii) require an efficient investment management process at the management company responsible for the selection of investments for a fund; (iv) provide an appropriate allocation of transaction costs between entering and leaving shareholders on the one hand and ongoing shareholders on the other hand; (v) allocate marketing and service costs appropriately among various groups or classes of fund shareholders; or (vi) protect the confidentiality of an investment manager's trading plans when the fund or funds are managed as part of a multi-product integrated investment process.

There is, therefore, a need for a novel system and method designed to improve fund investment performance, and provide features and safeguards lacking in mutual funds. There is a further need for a fund structure and transaction system that mitigates or eliminates certain transaction costs associated with currently available indexed ETFs, conventional mutual funds and other proposals for actively-managed ETFs. There is a need for an actively-managed exchange-traded fund creation, redemption and fund portfolio trading process that prevents dissemination of inappropriate information relating to a fund manager's investment and trading process and plans. There are yet additional needs for an improved fund management investment process and an improved secondary market fund share transaction system for investors.

SUMMARY OF THE INVENTION

These needs and others may be met by the present invention, one example of which is an investment fund financial product which includes a fund including a General Class of Fund Shares. The shares are tradable in a secondary market and are characterized as a redeemable share class of the fund. The fund has a set of rules governing daily creation and redemption of the General Class of Fund Shares by authorized participants. The rules include a provision allowing entry of assets to and removal of assets from the fund through an exchange-traded fund share creation and redemption process. This provision includes the exchange of a combination of financial instruments and cash designated by the fund for a specified number of the General Class of Fund Shares, the exchange priced at a net asset value for all positions. Another provision is an intra-day fund share net asset value proxy based on a fund portfolio distributed through electronic quotation vendors during the trading day at a specified interval greater than a 15-second interval.

Additional provisions may be provided. One provision is that notices of intention to create or redeem shares of the General Class of Fund Shares are received at a specified time prior to the time prices are determined for the calculation of the net asset value of the General Class of Fund Shares and for the calculation of the value of financial instruments exchanged for the General Class of Fund Shares. A second provision is that a Specialized Share Class is convertible from and to the General Class of Fund Shares.

A third provision is that the fund portfolio is divided into a first segment represented by a disclosed creation or redemption basket used in the fund share creation or redemption process and an undisclosed second segment representing the balance of the long and short or short equivalent positions in the fund portfolio such that a long investment in appropriately sized positions in each of the two segments replicates the net asset value performance of a specified number of the General Class of Fund Shares. A fourth provision is that a fund share net asset value proxy based on the start-of-day portfolio is published without modification at a specified interval and modified supplementary values are published at more frequent intervals within the specified interval. The supplementary values are modified by adding or subtracting values selected at random from a disclosed distribution to or from the fund share net asset value proxy.

A fifth provision is that creation orders are rejected if shares of the General Class of Fund Shares plus the asset value equivalent of a Specialized Share Class outstanding after the creation exceed a maximum size stated in terms of total fund assets or in terms of the number of the General Class of Fund Shares or equivalents.

A sixth provision is that a secondary market trading system is provided for trading the General Class of Fund Shares or a Specialized Share Class. The secondary market trading system allows bids or offers describing a number of shares or an amount of currency to be submitted to the trading system. The secondary market trading system allows executions priced for settlement relative to a net asset value or net asset value proxy to be calculated and published at or after a specified future time. The settlement price determined in a trade execution is stated at an agreed discount to the specified net asset value or net asset value proxy, at that net asset value or net asset value proxy or at an agreed premium to that net asset value or net asset value proxy.

Another example of the present invention is a computer system for controlling the portfolio trading process of investment funds. The system includes a fund portfolio composition management computer that determines creation and redemption baskets including a combination of financial instruments and cash to be exchanged for a General Class of Fund Shares. The fund shares are tradable in a secondary market and are characterized as a redeemable share class of the fund. A fund management computer is coupled to the fund portfolio composition management computer and controls purchases and sales of assets for the fund to achieve a target end-of-day portfolio after the exchange of some combination of financial instruments and cash designated by the fund for a specified number of the General Class of Fund Shares, the exchange priced at a net asset value for all positions. An industry utility coupled to the fund management computer accepts a file from the fund management computer and publishes a fund share net asset value proxy based on the fund portfolio without modification at a specified interval and publishes modified supplementary values at more frequent intervals within the specified interval. The supplementary values are modified by adding or subtracting values selected at random from a disclosed distribution to or from the unmodified fund share net asset value proxy.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the present invention. Together with the description, the drawings serve to explain the principles of the present invention.

BRIEF DESCRIPTION OF DRAWINGS

These and further aspects and advantages of the present invention will be discussed in more detail hereinafter with reference to the disclosure of preferred embodiments, and in particular with reference to the appended Figures wherein:

FIG. 1 is a block diagram of the systems used in the creation process for actively-managed exchange-traded funds (AMETFs, and improved indexed ETFs) according to the present invention;

FIG. 2A is a flow diagram of the communications and control system used to implement and ensure compliance with early creation-redemption cut-off time notification requirements;

FIG. 2B is a flow diagram reflecting the portfolio and fund management process the portfolio manager uses to respond to early notice of a creation or redemption;

DESCRIPTION OF THE PREFERRED EMBODIMENT

Figure 3:
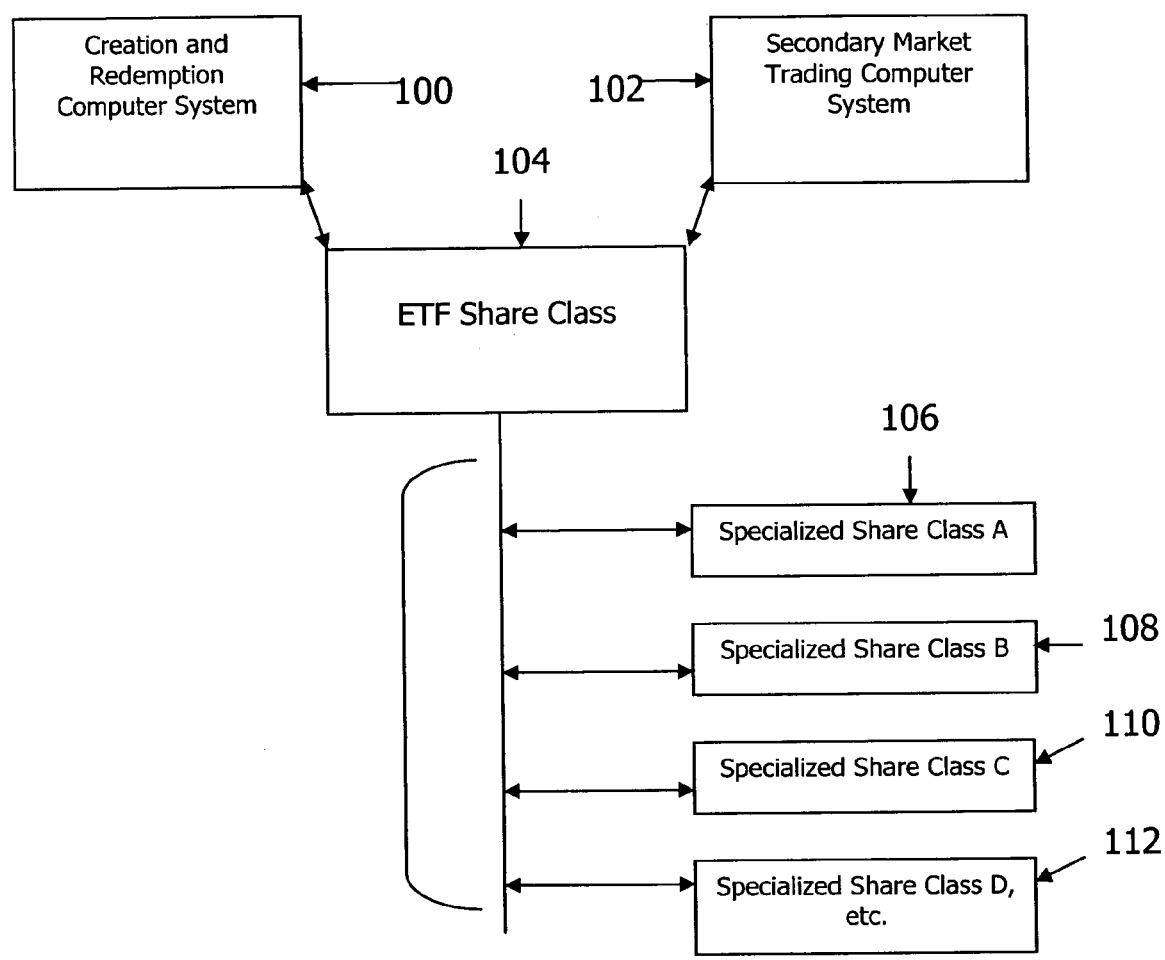
FIG. 3 is a block diagram of the relationship of all share classes.

While the present invention and its components are capable of embodiment in various forms, there is shown in the drawings and will hereinafter be described, a presently preferred embodiment with the understanding that the present disclosure is to be considered as an exemplification of the present invention, and is not intended to limit the present invention to the specific embodiment illustrated.

The preferred embodiment consists of major and several subsidiary components implemented through a variety of separate and related computer systems for the fund. These components may be used either individually or in a variety of combinations to achieve the joint objectives of protecting fund investors from the costs of providing liquidity to fund share traders, increasing the effectiveness of the portfolio management process and providing a new and improved way to trade exchange-traded fund shares on a secondary market. A number of the components of the preferred embodiment have more than one effect (e.g., shareholder protection plus improved portfolio management procedures). Each component can be implemented separately and is generally beneficial to fund shareholders even if the other components are not implemented at the same time or to the full extent described herein.

Certain components of the preferred embodiment improve expected performance and offer other advantages for investors in both AMETFs with a full active management investment process and a new kind of indexed ETF. This new kind of indexed ETF uses traditional indexing techniques but the index composition changes are not disseminated to the marketplace until after the fund portfolio manager has had an opportunity to change the fund portfolio to reflect any index changes. For the protection of investors, the portfolios of these new index funds are less transparent than the portfolios of existing benchmark index ETFs, but these funds are otherwise similar to other indexed ETFs. These funds can benefit from the same components of the present invention as the fully active AMETFs principally described herein. Consequently, these new index funds are covered by the description and claims as an AMETF variant. The Securities and Exchange Commission has indicated that these new index funds will be considered actively-managed funds for regulatory purposes. The secondary market trading system that is a component of the preferred embodiment is a useful method for secondary market trading of any securities basket product including existing ETFs, HOLDRs (trust-issued receipts that represent beneficial ownership of a specified group of stocks), BLDRs (unit investment trust portfolios of publicly traded Depositary Receipts) and structured notes linked to a multi-security index or basket as well as the AMETFs described herein.

In this Application, the ETF Share Class is sometimes referred to as the General Class of Fund Shares or Redeemable Shares to emphasize specific characteristics. The terms are interchangeable. A Business Day is any day the securities markets are open. Ordinarily a Business Day ends at 4:00 p.m. Eastern Time in United States securities markets, but some or all markets may close earlier on occasion, usually on the day before a holiday.

Features of the Preferred Embodiment that Primarily Protect Investors from Costs of Fund Share Trading
1. Early cut-off times for orders to purchase and redeem AMETF and ETF shares.
2. Entry and exit of investors through an ETF Share Class or an equivalent process to protect ongoing shareholders from the cost of providing liquidity to fund share traders.

Features of the Preferred Embodiment that Primarily Improve the Effectiveness of the Portfolio Management Process
3. Conversion of the ETF Share Class to and from Specialized Share Classes which, among other features, provide low-cost investment management services to institutional investors and convenience to individual investors who want to pay their advisors in a tax efficient way.
4. Less frequent intra-day dissemination of a precise AMETF portfolio valuation proxy.
5. Use of a risk factor model profile of the unrevealed segment of the AMETF portfolio in combination with a posted creation or redemption basket to facilitate hedging transactions by market makers and other traders in the exchange-traded fund shares.
6. Improving AMETF investor returns by concentrating portfolio manager effort on controlled-size funds; capping the assets the manager will accept for specific fund strategies and providing for a higher management fee on capped funds that perform well.

7. Organization of the AMETF investment manager to concentrate portfolio management efforts on the management of fund portfolios to reduce leakage of investment information by restricting the investment manager's activities. Voluntary lagged portfolio disclosure may be made more frequently than required.

The Secondary Market Fund Share Trading System Feature of the Preferred Embodiment 8. A trading system for AMETFs and other exchange-traded fund shares and basket instruments that parallels the traditional method for purchase and sale of conventional mutual funds at Net Asset Value (NAV) without compromising the investor protection provided by the exchange-traded fund creation and redemption structure.

FIG. 1 shows a generalized fund share creation system 10 which allows for the creation of an actively managed exchange traded fund (AMETF) and a new type of indexed exchange traded fund (ETF). The overall system 10 includes the actions of a portfolio manager 12 that manages the fund. The currently available indexed exchange-traded funds are benchmarked to an index such as standard published benchmark indexes including the Standard & Poors 500, the Russell 2000 and a variety of other domestic and international equity and fixed income indexes calculated and maintained by an index provider 14. Changes are made to such indexes from time to time and the changes are published widely. Changes in the indexes used for the improved indexed ETFs covered by the present invention will be communicated to the portfolio manager 12 confidentially by the index provider 14 or developed internally by the portfolio manager 12. If the fund is actively managed, or if the index is developed internally, the portfolio manager will determine any portfolio changes inside the portfolio manager 12. The system 10 also includes authorized participants 16, securities markets 18, a fund 20, broker/dealers 22 and investors 24.

The portfolio composition changes initiated by either the portfolio manager 12 or the index provider 14 are entered into a portfolio composition management computer 30 which is coupled to a fund management computer 32. The index changes for the improved index fund are not published to the world until after the fund has had an opportunity to implement the index changes in the portfolio. The portfolio composition changes to any AMETF including the new indexed ETFs need not be revealed except as required by regulators. The fund portfolio composition management computer 30 manages the relative weighting of positions in the portfolio and the fund management computer 32 translates the desired composition into creation and redemption baskets and orders to buy and sell securities for the portfolio. The fund management computer system 32 is also designed to ensure compliance with the cut-off times for fund trading and to provide an audit trail for the creation and redemption of fund shares as explained below. Links to and from the systems for monitoring and implementing creation and redemption orders are not shown in FIG. 1. It should be noted that the computer systems 30 and 32 and other computer systems described herein may be different groups of networked computers spread out over different locations.

The portfolio manager 12 supervises the daily process of determining Portfolio Composition Files (PCFs) reflected in the fund's published creation and redemption baskets. These creation and redemption baskets are published each day in advance of the start of trading of shares in the fund. The authorized participants 16 have a series of trading and trading management computers 34 that allow the exchange of securities, fund shares, and cash between the authorized participants 16 and the securities markets 18, broker/dealers 22 and the fund and fund operations 20. The authorized participants 16 each have a back office computer system 36 that performs functions such as confirming trades, accounting and risk management. The broker/dealers 22 each have a trading computer system 38 that facilitates trading and record-keeping in a variety of ways such as performing position management, billing and ensuring compliance with market rules. All of the transactions described herein are completed electronically via network connections including proprietary networks and even the Internet.

The authorized participants 16 may create shares in the fund by depositing a creation basket of securities (plus or minus a cash amount) in exchange for shares of the General Class of Fund Shares or redeem shares by depositing some of the General Class of Fund Shares in exchange for a redemption basket of securities (plus or minus a cash amount). The authorized participants 16 are broker-dealers and can include market makers and arbitrageurs. The market makers create and redeem shares to manage their inventories of fund shares whereas arbitrageurs hope to profit from small pricing differences between the price of the General Class of Fund Shares and the cost of creating or disposing of a creation or redemption basket. The authorized participants 16 have entered into agreements with industry transaction clearing organizations and agents of the fund whereby they agree to certain conditions in the creation or redemption of fund shares. The authorized participants 16 transact in the securities markets 18 to acquire the securities that typically make up part of the creation basket.

New shares of the General Class of Fund Shares of the fund 20 are created when an authorized participant 16 deposits one or more creation baskets which consist of securities designated by the portfolio manager 12 as a Portfolio Composition File (PCF) and a cash balancing amount which may be a payment to or a payment received from the fund. In return for a creation deposit, an authorized participant 16 receives newly created fund shares from the fund 20. A variety of internal and external computer systems allow the authorized participants 16 to deal in the secondary market for securities with other broker-dealers 22 or directly or indirectly with investors 24. The portfolio manager 12 uses the fund portfolio composition management computer 30 and the fund management computer system 32 to make appropriate changes to the creation basket reflecting desired changes in the basket of securities to be received in a creation. The portfolio manager 12 also distributes the creation and redemption baskets to the authorized participants 16, and a variety of market data vendors (not shown). This information is typically distributed through the National Securities Clearing Corporation (NSCC), an industry utility which is a subsidiary of the Depository Trust and Clearing Corporation (DTCC). This industry utility also distributes an intra-day net asset value proxy to market participants through market data vendors. The fund management computer system 32 also handles a variety of accounting and operating functions including the generation of buy and sell orders for the fund's portfolio and generation of instructions for the fund's custodian and transfer agent functions, as subsystems linked to the computer 40 in operations of the fund 20. A similar process (not shown) is used to develop and disseminate the redemption basket and facilitate the fund share redemption process.

The trading and trade management computers 34 facilitate the exchange of securities (including securities represented in the creation and redemption baskets), fund shares and cash between the authorized participants 16 and the securities markets 18, other broker-dealers 22 and the fund 20. The fund management computer system 32, among other functions, initiates and confirms a variety of transactions, and maintains records and appropriate information for an audit trail of all orders entered with and by the fund. The various features of the preferred embodiment of the improved fund will now be described.

Early Cut-Off Times for Orders to Purchase and Redeem AMETF and ETF Shares

While the established ETF in-kind creation and redemption structure provides inherent protection from the grosser forms of mispricing and shareholder abuse uncovered in the mutual fund trading scandals, an active fund manager and an astute index fund manager need greater flexibility in managing the portfolio than is inherent in the exchange-traded index fund creation and redemption process as it is used today. Specifically, the necessary and appropriate publication of fully transparent creation and redemption baskets discourages effective implementation of portfolio composition changes by these index funds' managers if the notice of intent to create or redeem does not come early enough to permit the portfolio manager to adjust the portfolio for the effect of creation and redemption trades on the portfolio composition. In addition, the creation and redemption baskets for actively-managed ETFs may not reflect the manager's target fund portfolio as accurately as they typically reflect the composition of a benchmark index ETF. The manager of any exchange-traded fund needs the ability to trade between the time the fund receives notice of an incoming fund share creation deposit or an outgoing redemption basket and the time the net asset value is next calculated.

Thus the provisions of the preferred embodiment of the AMETF and ETF require early notice of orders to purchase or redeem shares in the funds. Early notice permits the portfolio manager to adjust the portfolio composition and incorporate the market impact of the entry or exit of shareholders on the prices used to calculate the fund's net asset value (NAV). The entering or leaving shareholders demand liquidity and—with early notice to permit portfolio composition changes—they pay for it indirectly. The portfolio manager's ability to adjust the composition of the fund portfolio after receiving notice of a creation or redemption of shares using previously posted creation and redemption baskets is essential to transferring the costs of entering and leaving the portfolio to the entering and leaving shareholders and relieving the ongoing shareholders of this burden.

In the preferred embodiment, a time between 2:30 p.m. and 3:30 p.m. is listed as the cutoff for purchase or redemption of baskets on Business Days when the market closing is 4:00 p.m. Eastern Time. This time is only an example of what might be an appropriate cutoff time for domestic equity portfolios. The cutoff time range is selected to be an early enough cut-off notice to permit the portfolio manager to adjust the portfolio to an appropriate portfolio composition by the time the market closes. In specific cases, as governed by the prospectus or subject to approval by the fund's board, the fund might set an earlier or a later cut-off time to provide the best possible service to entering and leaving shareholders without compromising the protection of ongoing shareholders. For funds other than domestic equity funds, different cut-off times will be required. In the case of international equity funds, for example, the appropriate early cut-off time for funds holding more than 3% of their assets in stocks traded on one or more primary markets outside the United States, could be 4:00 p.m. on any U.S. Business Day for pricing at the net asset value next determined for the fund after a full trading day in the primary markets for stocks accounting for 97% of the fund's equity portfolio. The 2:30 p.m. creation/redemption cut-off time for domestic equity funds and comparable rules for other types of portfolios solves one of the fund industry's greatest investor protection problems.

The early order cut-off system is illustrated in a flow diagram in FIG. 2A. In the preferred embodiment, the fund shares are exchanged for baskets of securities and cash. The notice by an authorized participant 16 of its commitment to create or redeem fund shares before the posted cut-off time is communicated to the communications computer module 52, which in turn confirms the receipt of a notification to the authorized participant 16 and simultaneously transmits a time-stamped report to a fund compliance officer 54, an agent 56 designated by the primary regulator or by the fund board and the portfolio manager 58. The portfolio manager 58 initiates any necessary portfolio modification transactions. The reports to the fund compliance officer 54 and to the agent 56 designated by the regulator or the fund board insure a record in a form which fund personnel will not be able to tamper with to conceal late entry of creation or redemption orders, thus providing protection from the late-arriving orders that have been a problem for conventional mutual fund shareholders.

The portfolio management response to a creation or redemption order is shown in FIG. 2B. The notice of creation or redemption carries with it information about absolute and relative position changes that result from a creation or redemption. The portfolio position changes that result from the creation or redemption transaction(s) are broken out by the fund management computer 32 and appear in block 60 of FIG. 2B. The revised portfolio 62 is determined by the fund management computer 32 and a target portfolio 64 is created and maintained by the fund portfolio composition management computer 30. The target portfolio 64 reflects the percentage of holdings in each portfolio position developed by the fund portfolio composition management computer 30 and represents what the fund management computer 32 has determined is the appropriate portfolio the fund should hold at the end of the day. The fund management computer 32 compares the revised portfolio 62 to the target portfolio 64 and generates appropriate orders to buy and sell portfolio securities, developing a trading plan 68 for execution by the trading desk 70, preferably by the time of the NAV calculation. The trading plans are entered by a trading desk 70 (which is controlled by the fund management computer 32) into the transaction process in appropriate securities markets 18. Executions are reported as fund portfolio changes 74 and the updated portfolio 76, determined as of the close of the day's trading, becomes the then-current portfolio that is represented at the beginning of the process for the next trading day. Under this component of the preferred embodiment, an active portfolio manager and the manager of an improved index fund are given necessary and appropriate flexibility in managing the portfolio. The publication of totally transparent creation and redemption baskets which reflect the full fund portfolio composition discourages effective confidential implementation of portfolio composition changes by index fund managers. In AMETFs, including the improved ETF index funds, the creation and redemption baskets may not accurately reflect the portfolio manager's target fund portfolio. To protect ongoing shareholders, the manager of any exchange-traded fund, whether actively managed or based on an index, needs the ability to trade between the time the fund receives notice of an incoming fund share creation deposit or an outgoing fund share redemption basket and the time the net asset value is next calculated so that any transaction costs will be reflected in the prices used in the net asset value (NAV) calculations for the fund shares and the creation and redemption baskets.

Early notice permits the portfolio manager to adjust the portfolio composition and incorporate the market impact of the entry or exit of shareholders on the prices used to calculate the fund's NAV. The entering or leaving shareholders are demanding liquidity and they are indirectly paying for it. The portfolio manager's ability to change the composition of the fund portfolio after receiving notice of creation or redemption of fund shares using previously posted creation and redemption baskets is essential to transferring the costs of entering and leaving the portfolio to the entering and leaving shareholders and relieving the ongoing shareholders of this burden.

Entry and Exit of Investors Through an ETF Share Class or an Equivalent Process to Protect Ongoing Shareholders from the Cost of Providing Liquidity to Fund Share Traders.

Fully effective implementation of the improved fund requires that all entry of assets to and removal of assets from the fund is made through the generalized exchange-traded fund share creation and redemption process described above or a procedure providing equivalent protection for ongoing shareholders. This process protects ongoing fund shareholders from the costs of providing liquidity to entering and leaving shareholders. The late trading and market timing abuses uncovered at many mutual funds since September 2003 would not have been possible if the in-kind creation and redemption process, standard in exchange-traded funds, had been in effect for conventional mutual funds. The general requirement for in-kind creation and redemption not only protects fund shareholders from the cost of providing liquidity to traders by creating a clear audit trail for the order entry process, redemption in-kind (or partly in cash at the option of the fund) offers substantial advantages for taxable shareholders through deferral of capital gains realizations until a shareholder decides to sell fund shares.

Conversion of the ETF Share Class, Upon Shareholder Demand, to Specialized Share Classes A variety of Specialized Share Classes will be available for conversion from and back to the ETF Share Class used for fund shareholder entry and exit. These Specialized Share Classes provide custom management fee and marketing fee arrangements to accommodate different types of shareholders with investment objectives that coincide with the objective pursued by the fund. Among other features, these Specialized Share Classes are structured so that investors pay marketing and management fees in a tax-efficient manner and receive appropriate management fee discounts if they are large investors.

Under the U.S. tax code, separately billed fees paid by individuals for investment management services and various other services provided by financial intermediaries are not fully deductible against ordinary income taxes. For individuals subject to the Alternative Minimum Tax, separately billed fees may not be deductible at all. To preserve as much deductibility as possible, the most tax-efficient way for individuals to pay marketing and management fees is to pay them as management or service fees deducted from the investment income produced by funds in which they own shares. Separately billed marketing fees would similarly not be fully, or perhaps even partly, deductible and thus are often paid more tax efficiently when they are embedded in the cost of the fund and deducted from the income distributed by the fund.

Large institutional investors have more negotiating power than individual investors and traditionally pay lower investment management fees. However, in order to manage portfolios effectively and economically, it is best to bring all types of investors into a single pool rather than manage institutional portfolios separately from individual mutual fund portfolios. Such portfolio consolidation is another part of the purpose behind the use of Specialized Share Classes as explained below. Certain share classes would be available only to investors who were able to invest several million dollars or more in a particular fund. The structure of the share class relationships is shown in FIG. 3 and the computer system for share class conversion is illustrated in FIG. 4.

The share class relationships illustrated in FIG. 3 show an ETF Share Class creation and redemption system 100 similar to the creation side of the system illustrated in FIG. 1, and a secondary market trading computer system 102 which includes functions reflected in the securities markets 18, the trading system 34 of the authorized participants 16 and the trading computer systems 38 of the broker/dealers 22 in FIG. 1. Creation and redemption (entry and exit of assets to and from the fund) involves an ETF Share Class 104. Although the Specialized Share Classes might be traded in a secondary market under some circumstances, the only share class that is ordinarily directly creatable or redeemable in a transaction with the fund is the ETF Share Class. Other share classes might include, as examples, Specialized Share Class A, a front end load share class 106; Specialized Share Class B, a back end load share class 108; Specialized Share Class C, a level load share class 110; and Specialized Share Class D, an institutional share class with a reduced expense ratio 112, for the convenience of various shareholders. Some users of these shares might want to facilitate the payment of a marketing fee to an individual or organization that provides sales and marketing services or advice. Other Specialized Share Classes would provide a variety of embedded marketing and management fees. The share classes A-D are intended to be illustrative, not exhaustive.

Figure 4:
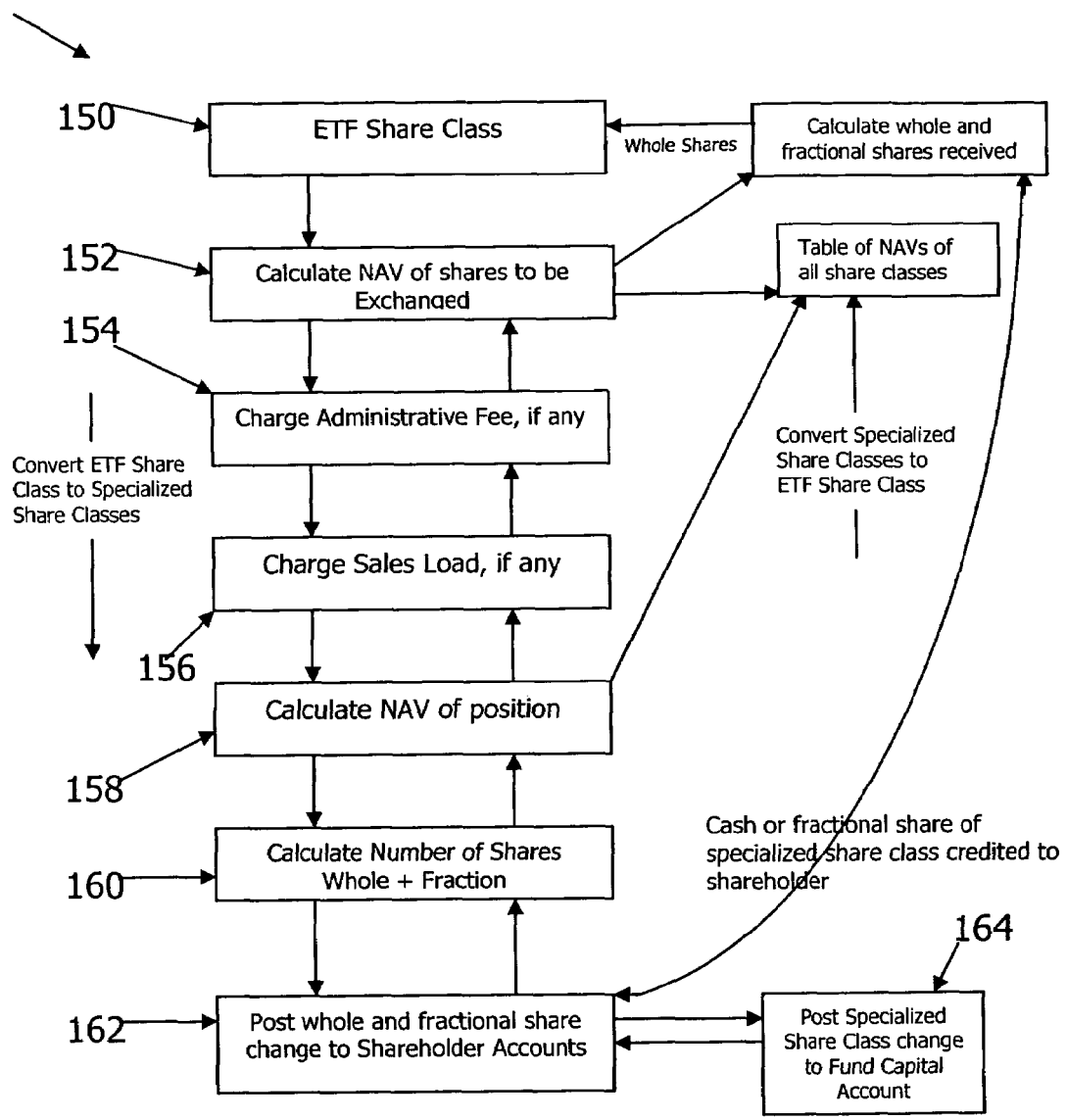
FIG. 4 is a flow diagram of the computerized system for conversion of the General Class of Fund Shares or ETF Share Class to and from Specialized Share Classes.

The share class conversions and exchanges in FIG. 4 are effected through the fund operation computer system 40 in FIG. 1. In FIG. 4, the process first identifies the ETF Share Class in step 150. The net asset value (NAV) of the shares to be exchanged is calculated in step 152. An administrative fee, if any is charged, is charged in step 154. A sales load, if any, associated with the particular Specialized Share Class is charged in step 156. For example, if the share is a share of Specialized Share Class A (with a front end load), the percentage charged for the front end load reduces the total value of the ETF Share Class shares entering into the calculation. The remaining value will determine the NAV available to be converted into Specialized Share Class A shares in step 158. The number of whole and fractional shares for the designated share class is then calculated in step 160. The whole and fractional share amount in the particular share class is posted to the fund's shareholder accounts in step 162. Changes in the Specialized Share Class are posted to the fund's capital account in step 164. Fractional shares will be available for all Specialized Share Classes. A Specialized Share Class may be created as the equivalent of the General Class of Fund Shares or ETF Share Class for fractional share positions under certain circumstances. When and if industry trading, clearing, transfer and custody systems are modified to accommodate fractional shares of fully DTCC-eligible securities, fractional shares of the ETF Share Class may be available. The process in steps 152 to 164 may be reversed to convert Specialized Share Classes back to the ETF Share Class. A table of NAVs of each share class is compiled daily by taking information from step 152 and step 158 and updating these NAVs for changes in the value of the underlying portfolio each day.

These calculations are necessary because when a sales load or a different management fee is charged to a particular share class, the NAV of that share class will change in different ways than the ETF Share Class NAV changes, and subsequent transfers to and from that share class must be at values consistent with charges to investors using that class. ETF share equivalents (which may be needed in conjunction with the implementation of a cap on the issuance of new fund shares) are calculated using the ratios of the Specialized Share Class NAVs to the ETF Share Class NAV and adding all the ETF share equivalents of the outstanding shares.

The table below shows the relationship of various alternative share classes to the ETF Share Class based on the ratio of their respective share classes' NAVs to the ETF Share Class NAV.

| ETF Share Class | Number of Shares Outstanding in Class | ETF Share-Equivalents Outstanding |
|---|---|---|
| | $X_{ETF}$ | $X_{ETF}$ |
| Specialized Share Class A | $X_A$ | $aX_A$ |
| Specialized Share Class B | $X_B$ | $bX_B$ |
| Specialized Share Class C | $X_C$ | $cX_C$ |
| Specialized Share Class D, etc. | $X_D$ | $dX_D$ |
| Sum of ETF Share Equivalents = | | Y |

In the table, a, b, c and d are equal to the ratio of their respective share class's NAV to the ETF Share Class NAV. The sum of the various share class ETF Share Class equivalent net asset values in total (Y) is compared to the fund share cap stated in a fund's prospectus or adopted by the fund board. If Y plus the ETF Share Class equivalents in a standard Creation Unit exceeds the designated cap, no creations will be permitted until a redemption occurs or the cap is increased under the terms of the fund prospectus.

Less Frequent Intra-Day Dissemination of a Precise AMETF Portfolio Valuation Proxy Another feature of the improved fund is an increase in the interval between "precise" intra-day fund share net asset value (NAV) proxies calculated and distributed by NSCC, an industry utility, through electronic quotation vendors during the trading day. The net asset value proxy is based on the contemporaneous bids and offers for each security in the portfolio translated into a per-ETF Share Class share value expressed as a bid and offer or as the midpoint between the bid and the offer. The time interval between publication of these precise net asset value proxies would be greater than the 15-second interval common with today's index ETFs, say, between 5 minutes and 60 minutes in the preferred implementation, and may vary within that range at the discretion of the fund's board of directors, subject to regulatory approval.

The reason for reducing the frequency of net asset value proxy dissemination is that dissemination every 15 seconds provides a total of more than 1500 fund share values during the standard trading day. Given that AMETFs will usually have fewer positions than a broad market index exchange-traded fund, every 15-second dissemination provides a great deal of information and would permit an astute analyst to back calculate the composition of the portfolio and learn inappropriate details about the fund's ongoing trading activities. The appropriate interval for precise NAV proxy dissemination will vary for different funds depending in part upon the number and nature of the securities in the portfolio. However, the appropriate time interval for publication of precise indicative values does not bear a rigid relationship to the number of securities in the portfolio or any measure of portfolio turnover. The fund directors would determine the interval between precise portfolio valuation proxies subject to regulatory approval. Reducing the amount of information on the content of the portfolio provided to the marketplace will protect the fund shareholders from front-running of transactions the fund portfolio manager is making to modify the fund portfolio.

The fund management computer system 32 in FIG. 1 supplies data to a secure market data server (not shown) that continuously updates the net asset value proxy of the fund shares as bids and offers for the portfolio securities change throughout the day. Net asset value proxies are published at an interval approved for each fund by the fund board. The current standard interval for indexed ETFs is every 15 seconds. If an approximate indicative value is required at 15-second intervals for the use of investors and market makers, a randomized process will meet this need while reducing the portfolio information content of net asset value proxy calculations disseminated between precise calculations. Specifically, the values between periodic releases of precise values based on the actual portfolio could be based on the 15-second interval precise portfolio values incremented or decremented by a number drawn at random from a disclosed probability distribution. The random increments and decrements in these values will eliminate the opportunity to use the net asset value proxy publication to determine portfolio composition, yet avoid an indicative price too far away from the actual portfolio value to be useful to market participants.

Use of a Risk Factor Model Profile of the Unrevealed Segment of the AMETF Portfolio in Combination with a Posted Creation or Redemption Basket to Facilitate Hedging Transactions A desirable feature of the preferred implementation is the use of a risk factor model to analyze the net portfolio positions that are not included in a fund's daily creation and redemption baskets. Factor models, including economic risk factor models, statistical risk factor models and factor models using principal component analysis, can be used in several ways to help market makers and other traders manage the evaluation of risk in positions affected by undisclosed portfolios like the net portfolio positions that are not included in an AMETF's daily creation and redemption baskets. The preferred implementation considers the creation or redemption basket to be part of any hedging portfolio and uses a factor model to describe only a supplementary hedging basket which the trader or market maker could use in addition to the creation or redemption basket to hedge the risk of trading or making a market in the fund shares. Output from this risk factor application is posted at least daily for use by any investor, trader, market maker or market data provider that wanted to use the factor model with either the creation or redemption basket to hedge the risk characteristics of the fund shares. The factor model output could take one of two forms: a factor format to be used by market participants to develop their own hedging portfolios based on the published factors or a fully developed hedging basket to be used by market participants in combination with the creation or redemption basket that the fund publishes.

In its model for trading AMETFs, the American Stock Exchange (AMEX) proposes to use one or more of a variety of risk factor models to develop a proxy portfolio that would closely track the behavior of the actual portfolio with a basket of tradable financial instruments for the purposes of providing a hedging basket and an intra-day share value proxy that would replace the 15-second actual portfolio proxy pricing that is standard for today's index ETFs. The AMEX proxy portfolio would not necessarily incorporate a posted creation or redemption basket or reflect any specific components of the fund portfolio in contrast to the preferred technique described herein.

The factor model application of the preferred embodiment departs significantly from the AMEX proposal. The proxy values for the fund produced by the factor models will provide as much information on the actual portfolio as the portfolio manager feels can be appropriately released to the market as reflected in the combination of: (1) the frequency of publication of precise values; (2) the parameters of the distribution from which increments and decrements are drawn; (3) the composition of the creation and redemption baskets; and (4) how the factor model output is published (factor format or hedging basket). By managing these four elements, the portfolio manager controls the information revealed, protecting current shareholders while providing as much information as possible to minimize fund share trading spreads.

Figure 5:
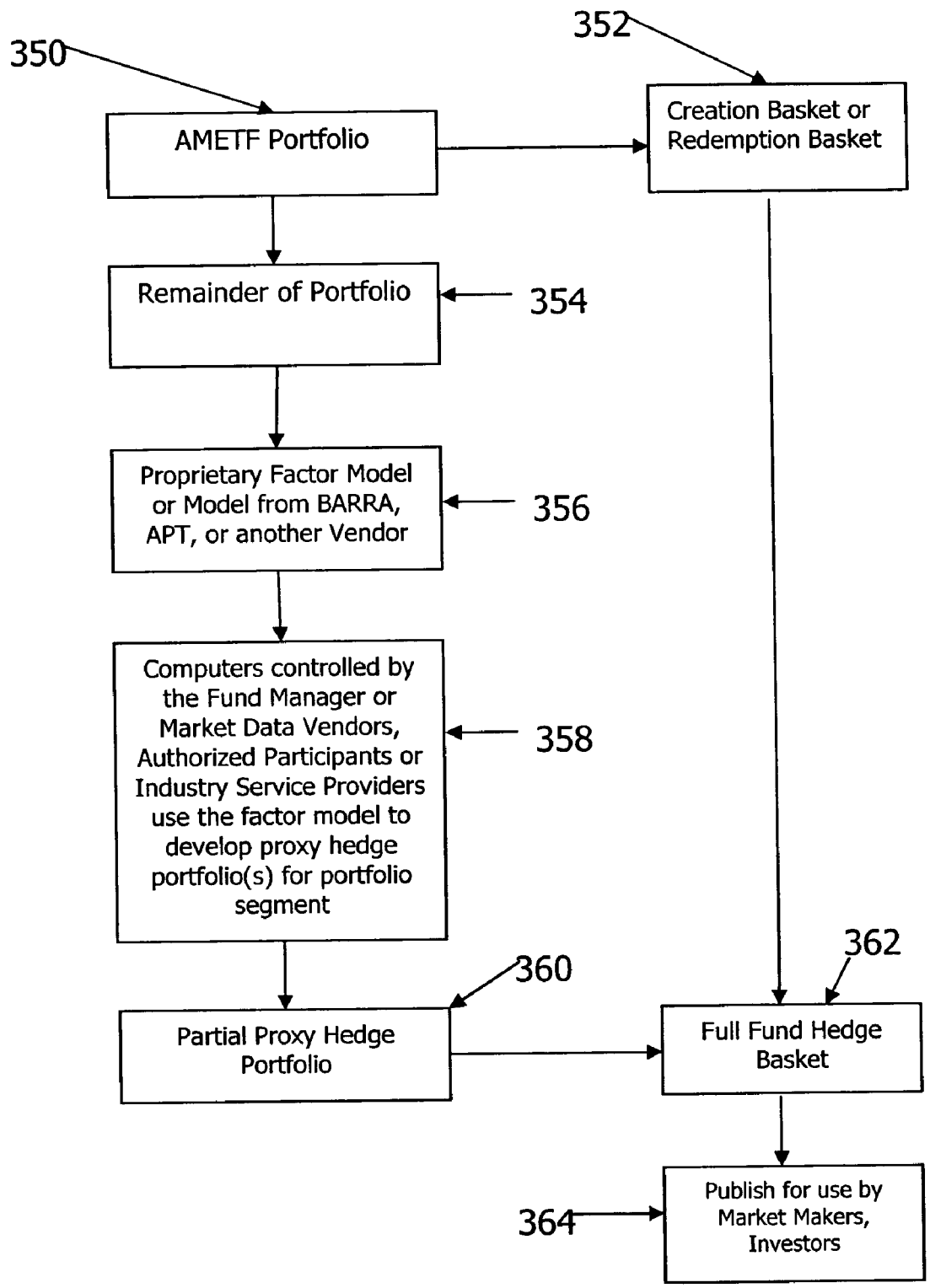
FIG. 5 is a flow diagram of the process for dividing the fund between the creation or redemption basket and net unrevealed portfolio components and performing a factor model analysis of the latter components and developing a hedging basket.

FIG. 5 shows a flow diagram for dividing the AMETF portfolio into published components (creation and redemption baskets) and its remaining residual confidential components which latter are described by a factor model for development of a hedging proxy portfolio. As illustrated in FIG. 5, information is developed from the AMETF portfolio in step 350. The creation and redemption baskets are created for dissemination in step 352. The remainder of the portfolio is separated in step 354. The creation and redemption baskets are published portfolio components and their composition is available to anyone for hedging purposes. Even though the creation and redemption baskets may contain financial instruments that are not in the fund portfolio or that are not as heavily weighted in the fund portfolio as in the creation or redemption baskets, these baskets can serve as part of a hedging position. Because the creation and redemption baskets may be overweighted in some long positions relative to the fund portfolio, the factor model for the remainder of the portfolio may reflect some short equivalent positions.

A factor model which is either a proprietary factor model or an industry standard factor model from a vendor such as BARRA or APT is selected in step 356. The output of the factor model selected is delivered to authorized participants, market data vendors and others in step 358. For maximum confidentiality with respect to fund portfolio composition, the output in step 358 could be delivered in step 360 as a suggested partial proxy hedge portfolio. For maximum flexibility for users, the output from an industry standard factor model from step 356 could be delivered as raw factor data for use in step 358 for the market participants to create their own hedging baskets. In the latter case, the recipients of the factor model output will use their own copy of commercial factor model software to develop a partial proxy hedge portfolio covering the undisclosed portfolio segment in step 360. Such a partial proxy hedge portfolio might be customized for a market participant's particular cost structure and hedging preferences in step 358. Market data vendors disclose a generic full fund hedge basket in step 362 and publish it for use by market makers and investors in step 364. This generic basket will be available to anyone who cares to use it at a nominal fee or at no cost.

Although this process may under some circumstances reveal slightly more about portfolio composition, it is superior to the AMEX proposal in several respects. First, instead of providing a value for share trading based on a proxy portfolio, the system will provide less frequent precise values based on the actual portfolio. If market participants desire share value estimates between the publication of, say, precise hourly values, they can use either the randomized proxy publication process described above or proxy value calculations based on the combination of the creation or redemption basket and the complementary hedging portfolio. Either choice would be expected to produce values at least as accurate as the all factor model pricing and hedging approach proposed by the AMEX. This process is also superior to the AMEX proposal in that creation and redemption baskets based in part on the actual portfolio will have the effect of reducing fund investor and market maker trading costs. Because some part of the redemption transaction will be in-kind, the use of redemption baskets containing some portfolio securities will assure a higher degree of tax efficiency than would be possible if the creation and redemption baskets did not contain any positions held in the fund portfolio. The availability of precise hourly values also facilitates a new secondary market fund share trading process described below.

Improving AMETF Investor Returns by Concentrating Portfolio Manager Effort on Controlled-Size Funds; Capping the Assets the Manager Will Accept for Specific Fund Strategies and Providing for a Higher Fee on Capped Funds that Perform Well In the preferred embodiment, after the AMETF complex reaches a size specified in its fund prospectuses, the investment process used by the management company would be used almost exclusively for products using the fund structure and process. A common set of directors will typically be directors of every fund managed using the fund family's common investment process and the directors will be responsible for ensuring that the investment process has adequate capacity to serve additional funds with different objectives without a detrimental effect on existing funds before the addition of funds not listed in the original documentation. In the preferred embodiment, the funds' prospectuses do not permit the fund manager to manage separate accounts or institutional pooled accounts except as share classes converted from ETF Share Classes. Rather than manage investment products that present a conflict of interest for the ETF Share Classes and the Specialized Share Classes converted from them, the investment manager might sell any excess research or idea capacity along a particular dimension to another investment manger on terms to be approved by the fund's directors. The manager could also have the opportunity to earn a higher fee on a capped portfolio.

Figure 6:
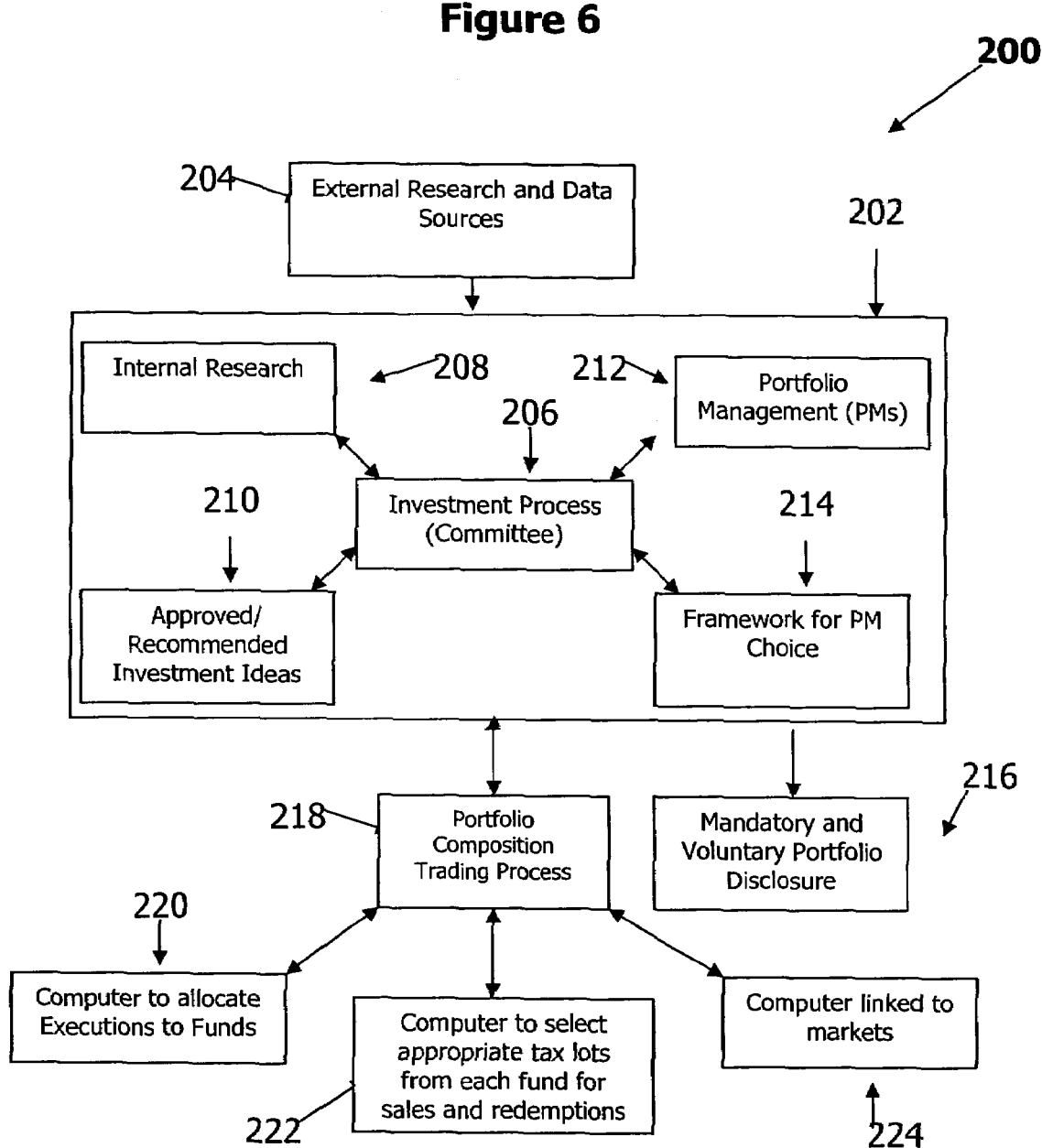
FIG. 6 is a block diagram of the portfolio management and trading system dedicated to the management of a family of AMETFs and other funds.

FIG. 6 illustrates the structure of such an AMETF dedicated portfolio management and trading system 200 which is part of the systems maintained by the portfolio manager 12 in FIG. 1. The portfolio management and trading system 200 is based on an investment process 206 incorporated in an investment management process 202 that also includes input from external research and data sources 204, internal research 208 and portfolio managers (PMs) 212 who are the essential and principal members of the investment process committee. The investment process committee 206 produces approved and recommended investment ideas 210 and a framework for portfolio management choices 214 to be used in the management of the organization's AMETF products. The investment management process 202 prepares the periodic mandatory and any voluntary fund portfolio disclosures 216. Voluntary disclosures could be made available with greater frequency than regulators require with the approval of the fund board. The investment management process 202 delivers instructions for changes to each fund through a portfolio composition trading process 218 that manages portfolio composition trading using the fund portfolio composition management computer system 30. The portfolio composition trading process 218 is indirectly involved in the allocation of executions to the various funds 220 using the fund management computer system 32 in FIG. 1. A tax management computer 222 stores tax data and selects appropriate tax lots of securities from each fund portfolio for delivery against sales and redemptions. A trading desk computer 224 links to various markets where trades are executed to complete the portfolio composition trading framework.

In the preferred implementation, the size of certain funds will be capped by provisions in the fund's prospectus or by a fund board resolution. The principal purpose of capping the size of some funds is to improve the probability that the funds will enjoy superior long-term performance for the benefit of their shareholders. In addition to or as a substitute for a fixed cap set by the prospectus, the fund could rely on fund board resolutions or use a computer system and database to compute the optimal size of a fund to determine the fund asset level at which a cap should be imposed by the fund board.

Figure 7:
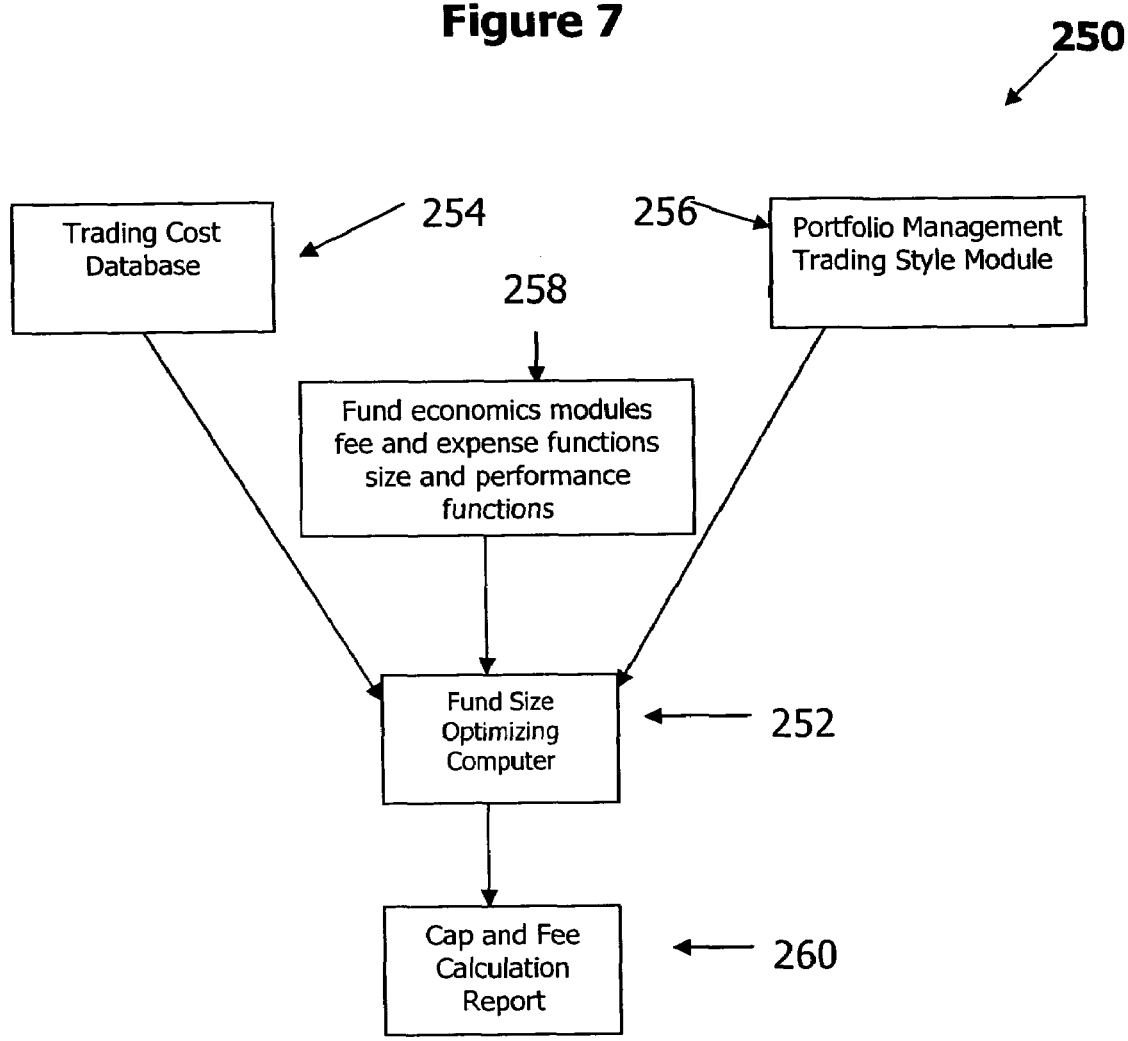
FIG. 7 is a block diagram which illustrates a computer system and databases used to estimate the optimum size of a fund for a cap calculation which may be used instead of embedding a fixed cap on the number of shares outstanding in a fund prospectus.

FIG. 7 is a block diagram of a computer system 250 designed to cap the size of a fund. It includes a fund size optimizing computer 252 coupled to a trading cost database 254 which includes, among other features, databases that link trading costs to the size of the positions which the family of funds as a group hold in individual securities with varying capitalizations and levels of trading activity. A separate trading style module 256 will contain information on the various fund trading styles and the trading cost experiences of the fund's portfolio managers and traders under different market conditions. A cost module 258 contains fee and expense functions for different fund sizes and performance functions based on industry experience and the experience of the managers employed by the funds. In addition, the cost module 258 has functions relating to the interaction between the fee structure and methods the funds are permitted to use to require reconversion of low management fee Specialized Share Classes to the ETF Share Class and an algorithm for changing the management fee on the exchange-traded share class in response to performance achieved by the fund's portfolio management process. The fund size optimizing computer 252 produces an appropriate cap and fee calculation report 260 for recommendation to the fund board.

The purpose of capping some funds is to create an environment which eliminates the traditional conflict between the interests of investors and the interests of investment managers which usually leads managers to accumulate large pools of assets that make superior investment performance difficult or impossible.

With the exception of some funds holding predominantly large capitalization stocks, the investment manager will state in the fund prospectus or the fund board will determine the maximum number of ETF equivalent shares that each fund in a family will issue. The manager may also use a controlled share-growth formula to prevent growth that will swamp the manager's ability to achieve superior performance for the fund. The cap could be increased or the formula modified at a future date if the manager was comfortable with its ability to manage a larger portfolio and if the fund board or shareholders approved a change.

One purpose of the computer system 250 in FIG. 7 is to provide fee incentives for the fund manager to manage a smaller pool of assets more intensely and more effectively, providing better performance for investors and equal or better compensation for the fund managers without increasing the size of the fund portfolios to the extent that superior performance is no longer possible.

The prospectus of a capped fund will state the maximum number of ETF equivalent shares that the fund will issue or will otherwise describe the process for limiting the size of the fund. The Specialized Share Classes may have share prices different from the per share price of the ETF Share Class. The ETF share equivalent of a share in a Specialized Share Class will be equal to its net asset value (NAV) divided by the NAV of the ETF shares. If the maximum total ETF share equivalent issuance for a fund is reached, no more shares will be issued unless shares are first redeemed or the maximum issuance is increased. In the preferred embodiment, an authorized participant that redeems shares to reduce its inventory of shares in a fund that has reached its maximum size will have the exclusive right to re-create those shares at net asset value (NAV) plus a standard creation fee for a period stated in the fund prospectus. If the redeeming authorized participant does not re-create within the stated period, the fund board could shrink the fund by lowering the cap.

Capping fund size in some portfolios can solve the problem of finding a superior active manager and having assets managed by that manager over a long period of time. Capping should permit portfolio managers to post better performance records and, subject to the operation of a process to increase the management fee as a reward for good performance, earn more income. With fund management fee increases linked to multi-year performance and capped fund shares trading at a premium to net asset value (NAV), both investors and managers can earn as much or more than they might earn from larger portfolios using traditional fund and fee structures. The new fee structure will provide an incentive for performance more in line with the fund shareholders' interests than current fee structures.

Figure 8:
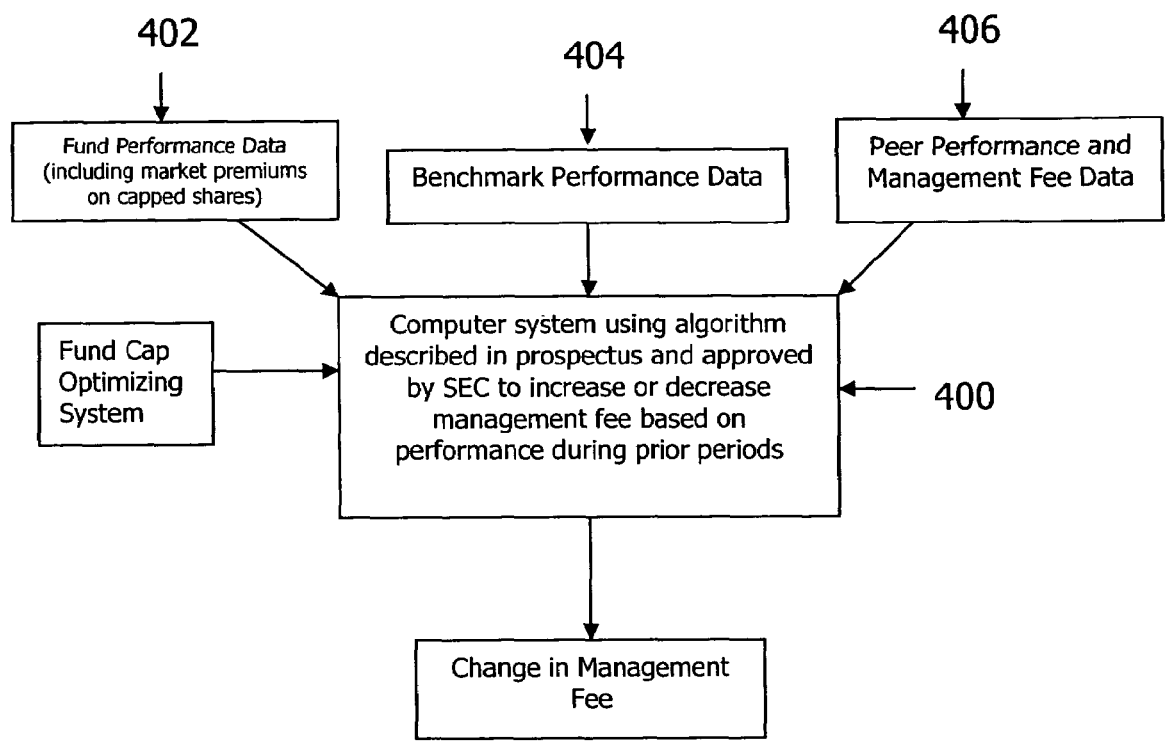
FIG. 8 is a block diagram illustrating a system for calculating changes in a fund management fee in response to changes in fund performance and other variables.

FIG. 8 shows a computer system 400 and associated data sources used to determine the management fee for a capped fund according to one aspect of the present invention. The computer system 400 includes a program based on an algorithm described in the fund prospectus and approved by the SEC that permits the fund board to increase or decrease the management fee based on fund performance during prior periods. The computer system 400 uses a fund performance data source 402, a benchmark performance data source 404 and a peer performance and management fee data source 406. The performance data will include traditional performance comparisons plus measures of average premiums over NAV that the ETF Share Class achieves. Such premiums may lead to an increased management fee in at least two ways. First, if the ETF Share Class trades at an average premium over NAV that exceeds a level stated in the prospectus for a specified time, the holders of Specialized Share Classes with discounted management fees can be required to convert their shares to the full fee ETF Share Class. Second, if the premium persists at a designated level, the management fee can be increased to a multiple of the base rate. Appropriate terms to reduce fees if performance drops below a specified standard are part of the algorithm. The algorithm reflects the fact that the manager is giving up the ability to increase assets beyond the cap on the strength of a superior performance record. Thus, the potential for fee reduction is more limited than the potential for a fee increase in some circumstances. The computer system 400 outputs appropriate changes in the management fee for consideration by the fund board or automatic implementation under terms stated in the fund prospectus.

The creation and redemption rules are designed to encourage occasional redemptions after a fund reaches its cap in terms of number of ETF share equivalents. The existence of a cap without modest variability in the number of shares outstanding forecloses redemptions and leads to much greater share price volatility in the secondary market trading of the capped funds' shares than is necessary or desirable. The absence of redemptions could also reduce the tax efficiency of the fund. It is appropriate that a market maker with a temporary excess inventory of shares in a fund is able to redeem fund shares from time to time, bringing the size of the fund below the stated ceiling on the number of shares the fund would issue. This redemption permits the fund share market price to more closely reflect changes in the fund's net asset value and avoid significant fluctuations in any premium which the market price of the shares may carry over the fund's net asset value. Subsequent to such a redemption and for a period designated in the fund's prospectus, the redeeming authorized participant has the exclusive right to re-create the shares it had redeemed under terms established by the fund prior to its closing to new creations. These terms are essentially a re-creation of the shares redeemed with an in-kind deposit priced at net asset value plus a normal creation fee. If the redeemer does not re-create within the designated period, the fund has the option of either shrinking the cap on the number of shares it would issue (to shrink the fund because management has determined that the capped size was too large) or permitting any authorized participant to create shares up to the share ceiling under standard (NAV) terms for fund share creations.

This redemption and re-creation provision helps market makers with fund share inventory management. It moderates fluctuations in any premium on the fund shares' price in the secondary market once the ceiling on share issuance is reached. It also provides a mechanism whereby an occasional in-kind redemption can enhance the fund's tax efficiency. The expiration of the right to re-create also permits the fund board to reduce the fund's maximum capitalization if the fund's market space becomes less liquid or if the original ceiling on share issuance was not set low enough to protect the fund from being overwhelmed with assets. Any decision to shrink the market capitalization originates with the manager, with the fund board or with shareholders by petition.

Organization of the AMETF Investment Manager to Concentrate Portfolio Management Efforts on the Management of Funds to Reduce Leakage of Investment Information by Restricting the Investment Manager's Activities.

Another feature of the preferred implementation of the present invention preserves the value of the output of the investment process more directly. With a unified portfolio management and trading operation and limitations on product offerings, shareholders are well-protected from inappropriate dissemination of investment information. Specifically, the value of an investment idea is preserved until the funds managed by the organization have time to buy or sell as much as they want of a particular security.

One of the weaknesses of the typical active manager's investment management process—in which different types of accounts are buying or selling the same security—is information leakage. With a single pool for each fund and funds as the manager's only product, there are no conflicts associated with the order in which transactions are made, and there is no leakage to outside organizations from trade confirmations sent to owners of separate accounts and individuals associated with institutional and non-public pooled portfolios. Of all possible structures for the collective management of investment portfolios, pooling is accomplished most efficiently and most confidentially with multiple-share-class funds that control publication of their portfolios.

With the concurrence of a fund's directors, the investment manager may disclose a recent fund portfolio to the public at appropriate intervals by any means the appropriate regulatory authorities approve. These may include posting on a website or other electronic dissemination. The disclosure process permits free and equal access to the information by any investor with Internet access. When implied portfolio disclosure is made through changes in creation and redemption basket composition, these changes are appropriately disseminated through public postings. Formal portfolio disclosure can be no less frequent than the quarterly disclosure with a 60-day lag now required of conventional mutual funds. However, in many cases, fund managers will be encouraged by market forces to make more frequent portfolio disclosures to increase the efficiency of secondary market trading in the fund shares without harm to ongoing fund shareholders from such disclosures. The computer model disclosed in FIG. 6 monitors both portfolio construction and transaction plans and governs and implements any portfolio disclosures that take place at shorter intervals than the interval imposed by regulators.

Figure 9:
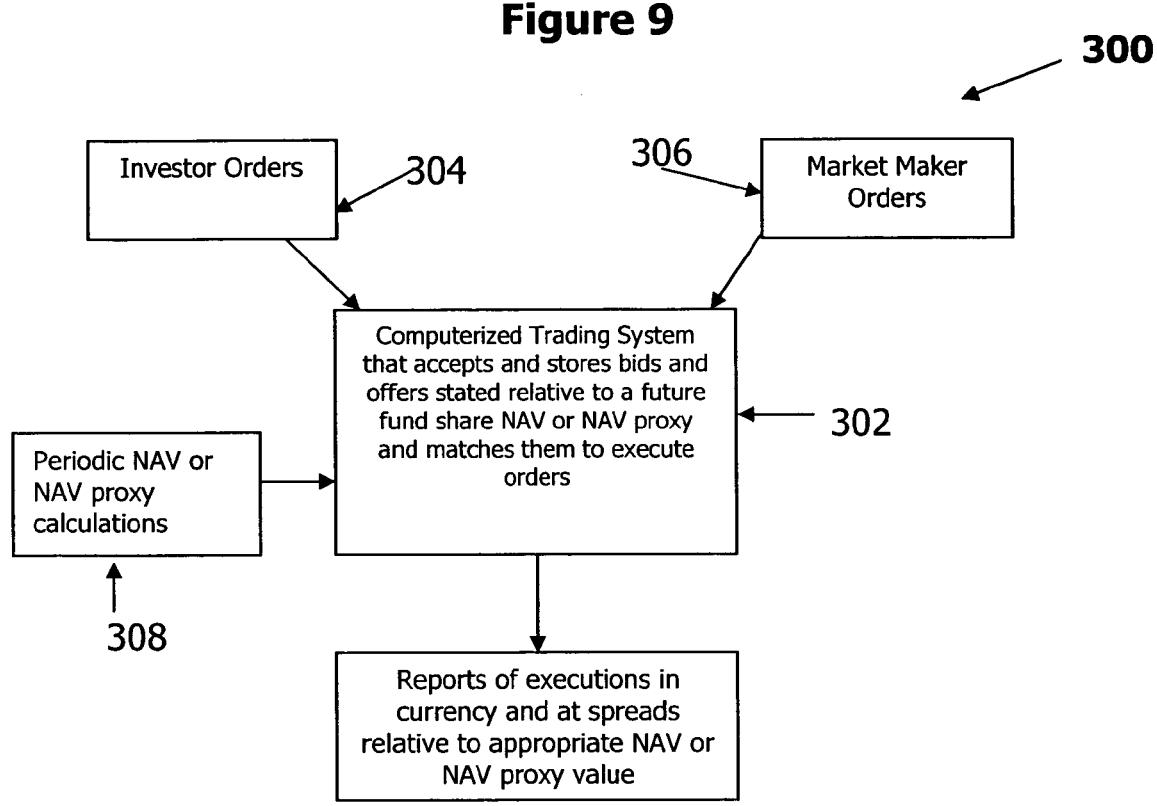
FIG. 9 is a block diagram of a computerized market for trading fund and other basket shares at prices linked to the future net asset value of the share classes.

A Trading System for ETFS and Other Basket Instruments that Parallels the Traditional Method for Purchase and Sale of Conventional Mutual Funds at Net Asset Value (NAV) without Compromising the Investor Protection Provided by the Exchange-Traded Fund Creation and Redemption Structure Licenses may be offered to appropriate trading venues to use computer systems designed to permit special intra-day auctions linked to periodic disclosure of the intra-day valuation proxy and the closing net asset value (NAV). These auctions will provide a trading mechanism intermediate in some respects between those of mutual funds and today's benchmark index ETFs. FIG. 9 shows a computerized market 300 allowing trading of ETF shares at prices linked to future NAV calculations which may be used as a pricing basis. The market 300 is centered around a computerized trading system 302. The computerized trading system 302 matches orders in terms of their statement of a bid or offer below, at or above the NAV or NAV proxy to be calculated on prevailing bids and offers for portfolio holdings and disclosed at a specified future time. The computerized trading system 302 accepts orders from investors 304 and market makers 306. The computerized trading system 302 receives periodic NAV calculations and NAV proxy calculations 308. The computerized trading system 302 produces reports of executions in currency and at spreads relative to the daily closing NAV or NAV proxy values posted at specified times. The trading system accommodates trading in any fund, trust or structured product for which a net asset value based on the prices of its holdings of securities or other financial instruments is periodically calculated.

The NAV-linked executions at stated times permit investors to place orders with market makers through traditional financial intermediaries for purchase and sale of shares at a price linked to an hourly posting of the intra-day net asset value proxy or at the official end-of-day net asset value. In some cases, these trades may be done at a spread and in others the market maker may provide a guarantee of a fill at net asset value with no spread or commission—the effective execution cost depending in part upon the time interval between the entry of the order by the investor or the investor's agent and the price calculation. Instead of making a market at a specific price, the market maker bids and offers at a spread below, at and above the next reported hourly intra-day proxy value or the closing NAV. The spread away from the designated NAV determination will generally widen as the time of price determination draws closer because the market maker has less time before the price determination to hedge or offset risk with another trade.

Using the closing NAV as the target in such a trading structure makes the pricing and trading of ETFs much like the conventional mutual fund trading process. Market makers may be willing to guarantee execution with no commission at the closing net asset value on orders received far enough in advance. Obviously, an order for execution at today's NAV with no commission is not acceptable to a market maker after a certain time. The cut-off time for such an order may vary among funds and among market makers.

While mutual fund transaction systems are designed to accommodate trades denominated in dollars with share positions expressed as whole and fractional shares, stock and ETF trading systems and, most significantly, clearing systems do not accommodate fractional shares. Some firms show fractional stock or ETF shares in a customer's account but such fractional share positions cannot be transferred electronically to other firms. The trading mechanism of the preferred embodiment converts part or all of a dollar-based transaction into a Specialized Share Class with the same per share NAV as the General Class of Fund Shares and the appropriate share position will appear in the customer's account as a conventional fund share class position. This feature adds to the similarity of this trading process to the traditional mutual fund transaction process.

Cost Savings to Investors and Investment Managers

The following table compares estimates of the costs experienced by a typical long-term investor in an actively-managed domestic equity mutual fund to the costs of an actively-managed domestic equity version of the new fund according to the present invention. The potential cost/performance difference is as much as 4.10% per year. The new structure offers substantial advantages to investors, largely from eliminating unnecessary or inappropriate costs and fund size-related performance penalties.

Total Annual Shareholder Cost Comparison for Actively-Managed Funds

|  | Equity Mutual Fund | New Equity Fund |
|---|---|---|
| Expense Ratio | 1.0% | 1.0% |
| Portfolio Composition Trades Inside the Fund | 1.5% | 1.5% |
| Fund Share Trading Liquidity Costs | 1.4% |  |
| Leakage of Investment Info/Index Publication | 0.35% |  |
| Fund Supermarket vs. Multi-Share Class ETF | 0.35% |  |
| Performance Penalty from Oversized Funds, Net of Higher Performance Fee | Up to 2.00% |  |
| Annual Total | 6.60% | 2.50% |

In this table, there are no recurring fund share trading liquidity costs for the new fund structure because any costs to enter and leave the ETF Share Class are paid by the trading shareholder only when entering or leaving the fund. The estimate of the cost of information leakage is based on an estimate of half the typical annual cost of the publication effect of S&P 500 composition changes. The fund supermarket costs are usually annual costs to all of a fund's shareholders in no transaction fee (NTF) shares, whether they use the fund supermarket or not. Some annual supermarket fees paid by funds are higher than 0.35%. There are no annual marketing fees in the new structure without a specific agreement by the investor to pay them in connection with ownership of a Specialized Share Class. The performance penalty associated with fund size is an estimate based on limited data from active fund managers and trading cost analysts.

It will be apparent to those skilled in the art that various modifications and variations can be made in the method and system of the present invention without departing from the spirit or scope of the present invention. Thus, the present invention is not limited by the foregoing descriptions but is intended to cover all modifications and variations that come within the scope of the spirit of the present invention and the claims that follow.

What is claimed is:

1. A computer-based method for managing an investment fund having (i) a portfolio comprised of any combination of financial instruments and cash and (ii) a general class of fund shares tradable in a secondary market, wherein assets enter and are removed from said investment fund through an exchange-traded fund share creation and redemption process governed by a set of rules, the method comprising:

at least one of specifying and delivering information that identifies a combination of financial instruments and cash to be exchanged for a specified number of shares of said general class of fund shares;

receiving a notice of commitment to create or redeem shares of said general class of fund shares by a specified time prior to a time prices are determined for calculating a net asset value of said general class of fund shares and calculating a value of said financial instruments and cash exchangeable for a specified number of shares of said general class of fund shares;

at least one of (i) creating new shares of said general class of fund shares by receiving any combination of financial instruments and cash exchangeable for said new shares; and (ii) redeeming existing shares of said general class of find shares by delivering any combination of financial instruments and cash exchangeable for said existing shares; and wherein said specifying and delivering steps, said receiving step, and said creating and redeeming step are executed by one or more computers.

2. The method of claim 1, wherein greater than a specified percentage of said financial instruments held by said investment fund are traded on one or more primary markets outside of the United States, and wherein said financial instruments trade on said primary market after receipt of said notice of commitment to create or redeem shares and before prices are determined for calculation of a net asset value of said fund shares and calculation of a value of said financial instruments.

3. The method of claim 1, further comprising at least one of (i) purchasing one or more financial instruments and (ii) selling one or more financial instruments to modify said portfolio prior to a time prices are determined for calculating a net asset value of said general class of fund shares and calculating a value of said financial instruments and cash exchangeable for a specified number of shares of said general class of fund shares.

4. The method of claim 1, further comprising rejecting said received notice of commitment to create shares if said created shares would increase the fund size beyond a maximum fund size stated in terms of at least one of (i) a total number of shares of said general class of fund shares and equivalents and (ii) a total value of fund assets.

5. The method of claim 4, wherein said maximum fund size is based on at least one of: (i) a measure of liquidity of holdings in said fund portfolio; (ii) an imposed limit on expansion of said investment fund set in a prospectus of said fund, and (iii) an imposed limit on expansion set by a fund board.

6. The method of claim 4, wherein a management fee to be paid to an investment manager of said investment fund is changed based on at least one of (i) the absolute or relative performance of said investment fund and (ii) a premium or discount from net asset value at which said fund shares trade in said secondary market.

7. The method of claim 1, further comprising at least one of calculating and distributing an intra-day fund share net asset value proxy based on said fund portfolio during a trading day at a specified interval greater than a 15-second interval.

8. The method of claim 7, further comprising at least one of calculating and distributing modified supplementary net asset value proxies at more frequent intervals within said specified interval.

9. The method of claim 8, wherein said modified supplementary net asset value proxies are computed by at least one of (i) adding random values to and (ii) subtracting random values from said intra-day find share net asset value proxy at times within said specified interval.

10. A computer-based method for managing an investment fund having (i) a portfolio comprised of any combination of financial instruments and cash and (ii) a general class of fund shares tradable in a secondary market, wherein assets enter and are removed from said investment fund through an exchange-traded fund share creation and redemption process governed by a set of rules, the method comprising:
   at least one of specifying and delivering information that identifies a combination of financial instruments and cash to be exchanged for a specified number of shares of said general class of fund shares;
   receiving a notice of commitment to create or redeem shares of said general class of find shares by a specified time prior to a time prices are determined for calculating a net asset value of said general class of fund shares and calculating a value of said financial instruments and cash exchangeable for a specified number of shares of said general class of fund shares;
   at least one of (i) creating new shares of said general class of find shares by receiving any combination of financial instruments and cash exchangeable for said new shares; and (ii) redeeming existing shares of said general class of fund shares by delivering any combination of financial instruments and cash exchangeable for said existing shares; and
   at least one of (i) purchasing one or more financial instruments and (ii) selling one or more financial instruments to modify said portfolio prior to a time prices are determined for calculating a net asset value of said general class of fund shares and calculating a value of said financial instruments and cash exchangeable for a specified number of shares of said general class of fund shares; and
      wherein said specifying and delivering steps, said receiving step, said creating and redeeming steps, and said purchasing and selling steps are executed by one or more computers.

11. The method of claim 10, wherein greater than a specified percentage of said financial instruments held by said investment find are traded on one or more primary markets outside of the United States, and wherein said financial instruments trade on said primary market after receipt of said notice of commitment to create or redeem shares and before prices are determined for calculation of a net asset value of said fund shares and calculation of a value of said financial instruments.

12. The method of claim 10, further comprising at least one of calculating and distributing an intra-day fund share net asset value proxy based on said fund portfolio during a trading day at a specified interval greater than a 15-second interval.

13. A computer-based method for managing an investment fund having (i) a portfolio comprised of any combination of financial instruments and cash and (ii) a general class of fund shares tradable in a secondary market, wherein assets enter and are removed from said investment fund through an exchange-traded fund share creation and redemption process governed by a set of rules, the method comprising:
   at least one of specifying and delivering information that identifies a combination of financial instruments and cash to be exchanged for a specified number of shares of said general class of fund shares;
   receiving a notice of commitment to create or redeem shares of said general class of fund shares by a specified time prior to a time prices are determined for calculating a net asset value of said general class of fund shares and calculating a value of said financial instruments and cash exchangeable for a specified number of shares of said general class of fund shares;
   at least one of (i) creating new shares of said general class of fund shares by receiving any combination of financial instruments and cash exchangeable for said new shares; and (ii) redeeming existing shares of said general class of fund shares by delivering any combination of financial instruments and cash exchangeable for said existing shares;
   at least one of (i) purchasing one or more financial instruments and (ii) selling one or more financial instruments to modify said portfolio prior to a time prices are determined for calculating a net asset value of said general class of fund shares and calculating a value of said financial instruments and cash exchangeable for a specified number of shares of said general class of fund shares; and
   at least one of calculating, distributing, and receiving an intra-day fund share net asset value proxy based on said fund portfolio during a trading day at a specified interval greater than a 15-second interval; and
      wherein said specifying and delivering steps, said receiving step, said creating and redeeming steps, said purchasing and selling steps, and said calculating, distributing, and receiving steps are executed by one or more computers.

14. The method of claim 13, further comprising at least one of calculating and distributing modified supplementary net asset value proxies at more frequent intervals within said specified interval.

15. The method of claim 14, wherein said modified supplementary net asset value proxies are computed by at least one of (i) adding random values to and (ii) subtracting random values from said intra-day fund share net asset value proxy at times within said specified interval.

16. The method of claim 13, wherein greater than a specified percentage of said financial instruments held by said investment fund are traded on one or more primary markets outside of the United States, and wherein said financial instruments trade on said primary market after receipt of said notice of commitment to create or redeem shares and before prices are determined for calculation of a net asset value of said fund shares and calculation of a value of said financial instruments.

17. The method of claim 13, further comprising rejecting said received notice of commitment to create shares if said created shares would increase the fund size beyond a maximum fund size stated in terms of at least one of (i) a total number of shares of said general class of fund shares and equivalents and (ii) a total value of fund assets.

18. The method of claim 17, wherein a management fee to be paid to an investment manager of said investment fund is changed based on at least one of (i) the absolute or relative performance of said investment fund and (ii) a premium or discount from net asset value at which said fund shares trade in said secondary market.

19. A computer-based method for making markets in shares of an investment fund having (i) a portfolio comprised of any combination of financial instruments and cash and (ii) a general class of fund shares tradable in a secondary market, wherein an authorized participant at least one of creates and redeems shares of said investment fund through an exchange-traded fund share creation and redemption process governed by a set of rules, the method comprising:
receiving information that identifies a combination of financial instruments and cash to be exchanged for a specified number of shares of said general class of fund shares;
delivering a notice of commitment to create or redeem shares of said general class of fund shares by a specified time prior to a time prices are determined for calculating a net asset value of said general class of fund shares and calculating a value of said financial instruments and cash exchangeable for a specified number of shares of said general class of fund shares; and
at least one of (i) delivering any combination of financial instruments and cash in exchange for new shares of said general class of fund shares and (ii) receiving any combination of financial instruments and cash in exchange for existing shares of said general class of fund shares,
wherein said receiving step, said delivering step, and said delivering and receiving steps are executed by one or more computers.

20. The method of claim 19, further comprising receiving an intra-day fund share net asset value proxy based on said fund portfolio during a trading day at a specified interval greater than a 15-second interval.

21. The method of claim 20, further comprising receiving modified supplementary net asset value proxies at more frequent intervals within said specified interval.

22. The method of claim 21, wherein said modified supplementary net asset value proxies are computed by at least one of (i) adding random values to and (ii) subtracting random values from said intra-day fund share net asset value proxy at times within said specified interval.

23. The method of claim 19 wherein said rules permit a rejection of said delivered notice of commitment to create shares if said created shares would increase the fund size beyond a maximum fund size stated in terms of at least one of (i) a total number of shares of said general class of fund shares and equivalents and (ii) a total value of fund assets, and wherein an authorized participant that redeems fund shares after said investment fund has reached said maximum fund size is permitted to re-create shares.

24. A computer-based method for trading shares of an investment fund having (i) a portfolio comprised of any combination of financial instruments and cash and (ii) a general class of fund shares tradable in a secondary market, wherein assets enter and are removed from said investment find through an exchange-traded fund share creation and redemption process, the method comprising:
trading one or more shares of said general class of fund shares of said investment fund on a secondary market;
executing a trade for said one or more shares priced relative to a net asset value or net asset value proxy to be calculated and published at or after a specified time;
determining a price for said executed trade, wherein said determined price is from a set of prices that are relative to said net asset value or said net asset value proxy, said set of prices comprising (a) a first price that is at a specified discount to said net asset value or said net asset value proxy; (b) a second price that is equal to said net asset value or said net asset value proxy; and (c) a third price that is at a specified premium to said net asset value or said net asset value proxy; and
submitting said executed trade for settlement at said determined price,
wherein said trading, executing, determining, and submitting steps are executed on one or more computers.

25. A computer-based method for managing an investment fund having a portfolio comprised of any combination of financial instruments and cash and a general class of fund shares tradable in a secondary market, wherein assets enter and are removed from said investment fund through an exchange-traded fund share creation and redemption process governed by a set of rules, the method comprising:
at least one of specifying and delivering information consisting of a designated combination of financial instruments and cash to be exchanged for a specified number of shares of said general class of fund shares;
receiving a notice of commitment to create or redeem shares of said general class of fund shares by a specified time prior to a time prices are determined for calculating a net asset value of said general class of fund shares and calculating a value of said financial instruments and cash exchangeable for a specified number of shares of said general class of fund shares; and
at least one of (i) creating new shares of said general class of fund shares by receiving any combination of financial instruments and cash exchangeable for said new shares; and (ii) redeeming existing shares of said general class of fund shares by delivering any combination of financial instruments and cash exchangeable for said existing shares,
wherein said fund portfolio is divided into (i) one of a first segment represented by said designated financial instruments and a first segment represented by said designated financial instruments and cash and (ii) an undisclosed second segment representing any combination of long and short or short equivalent positions and cash in said fund portfolio, and wherein a long investment in appropriately sized positions in said first and second segments replicates a net asset value performance of a specified number of said general class of fund shares; and
wherein said specifying and delivering steps, said receiving step, and said creating and redeeming steps are executed on one or more computers.

26. A computer-based system for managing an investment fund having (i) a portfolio comprised of any combination of financial instruments and cash and (ii) a general class of fund shares tradable in a secondary market, wherein assets enter and are removed from said investment fund through an exchange-traded fund share creation and redemption process governed by a set of rules, the system comprising:
a module configured to at least one of specify and deliver information that identifies a combination of financial instruments and cash to be exchanged for a specified number of shares of said general class of fund shares;
a module configured to receive a notice of commitment to create or redeem shares of said general class of fund shares by a specified time prior to a time prices are determined for calculating a net asset value of said general class of fund shares and calculating a value of said financial instruments and cash exchangeable for a specified number of shares of said general class of fund shares; and a module configured to at least one of (i) create new shares of said general class of fund shares by receiving any combination of financial instruments and cash exchangeable for said new shares; and (ii) redeem existing shares of said general class of fund shares by delivering any combination of financial instruments and cash exchangeable for said existing shares.

27. The system of claim 26, wherein greater than a specified percentage of said financial instruments held by said investment fund are traded on one or more primary markets outside of the United States, and wherein said financial instruments trade on said primary market after receipt of said notice of commitment to create or redeem shares and before prices are determined for calculation of a net asset value of said fund shares and calculation of a value of said financial instruments.

28. The system of claim 26, further comprising a module configured to at least one of (i) purchase one or more financial instruments and (ii) sell one or more financial instruments to modify said portfolio prior to a time prices are determined for calculating a net asset value of said general class of fund shares and calculating a value of said financial instruments and cash exchangeable for a specified number of shares of said general class of fund shares.

29. The system of claim 26, further comprising a module configured to reject said received notice of commitment to create shares if said created shares would increase the fund size beyond a maximum fund size stated in terms of at least one of (i) a total number of shares of said general class of fund shares and equivalents and (ii) a total value of fund assets.

30. The system of claim 29, wherein said maximum fund size is based on at least one of: (i) a measure of liquidity of holdings in said fund portfolio; (ii) an imposed limit on expansion of said investment fund set in a prospectus of said fund, and (iii) an imposed limit on expansion set by a fund board.

31. The system of claim 29, wherein a management fee to be paid to an investment manager of said investment fund is changed based on at least one of (i) the absolute or relative performance of said investment fund and (ii) a premium or discount from net asset value at which said fund shares trade in said secondary market.

32. The system of claim 26, further comprising a module configured to at least one of calculate and distribute an intra-day fund share net asset value proxy based on said fund portfolio during a trading day at a specified interval greater than a 15-second interval.

33. The system of claim 32, further comprising a module configured to at least one of calculate, distribute, and receive modified supplementary net asset value proxies at more frequent intervals within said specified interval.

34. The system of claim 33, wherein said module configured to calculate said modified supplementary net asset value proxies comprises a module configured to at least one of (i) add random values to and (ii) subtract random values from said intra-day fund share net asset value proxy at times within said specified interval.

35. A computer-based system for managing an investment fund having (i) a portfolio comprised of any combination of financial instruments and cash and (ii) a general class of fund shares tradable in a secondary market, wherein assets enter and are removed from said investment fund through an exchange-traded fund share creation and redemption process governed by a set of rules, the system comprising:

a module configured to at least one of specify and deliver information that identifies a combination of financial instruments and cash to be exchanged for a specified number of shares of said general class of fund shares;

a module configured to receive a notice of commitment to create or redeem shares of said general class of fund shares by a specified time prior to a time prices are determined for calculating a net asset value of said general class of fund shares and calculating a value of said financial instruments and cash exchangeable for a specified number of shares of said general class of fund shares;

a module configured to at least one of (i) create new shares of said general class of fund shares by receiving any combination of financial instruments and cash exchangeable for said new shares; and (ii) redeem existing shares of said general class of fund shares by delivering any combination of financial instruments and cash exchangeable for said existing shares, and a module configured to at least one of (i) purchase one or more financial instruments and (ii) sell one or more financial instruments to modify said portfolio prior to a time prices are determined for calculating a net asset value of said general class of fund shares and calculating a value of said financial instruments and cash exchangeable for a specified number of shares of said general class of fund shares.

36. The system of claim 35, wherein greater than a specified percentage of said financial instruments held by said investment fund are traded on one or more primary markets outside of the United States, and wherein said financial instruments trade on said primary market after receipt of said notice of commitment to create or redeem shares and before prices are determined for calculation of a net asset value of said fund shares and calculation of a value of said financial instruments.

37. The system of claim 35, further comprising a module configured to at least one of calculate and distribute an intra-day fund share net asset value proxy based on said fund portfolio during a trading day at a specified interval greater than a 15-second interval.

38. A computer-based system for managing an investment fund having (i) a portfolio comprised of any combination of financial instruments and cash and (ii) a general class of fund shares tradable in a secondary market, wherein assets enter and are removed from said investment fund through an exchange-traded fund share creation and redemption process governed by a set of rules, the system comprising:

a module configured to at least one of specify and deliver information that identifies a combination of financial instruments and cash to be exchanged for a specified number of shares of said general class of find shares;

a module configured to receive a notice of commitment to create or redeem shares of said general class of fund shares by a specified time prior to a time prices are determined for calculating a net asset value of said general class of fund shares and calculating a value of said financial instruments and cash exchangeable for a specified number of shares of said general class of fund shares;

a module configured to at least one of (i) create new shares of said general class of find shares by receiving any combination of financial instruments and cash exchangeable for said new shares; and (ii) redeem existing shares of said general class of fund shares by delivering any combination of financial instruments and cash exchangeable for said existing shares;

a module configured to at least one of (i) purchase one or more financial instruments and (ii) sell one or more financial instruments to modify said portfolio prior to a time prices are determined for calculating a net asset value of said general class of fund shares and calculating a value of said financial instruments and cash exchangeable for a specified number of shares of said general class of fund shares; and a module configured to at least one of calculate, distribute, and receive an intra-day fund share net asset value proxy based on said fund portfolio during a trading day at a specified interval greater than a 15-second interval.

39. The system of claim 38, further comprising a module configured to at least one of calculate and distribute modified supplementary net asset value proxies at more frequent intervals within said specified interval.

40. The system of claim 39, wherein said module configured to calculate said modified supplementary net asset value proxies comprises a module configured to at least one of (i) add random values to and (ii) subtract random values from said intra-day find share net asset value proxy at times within said specified interval.

41. The system of claim 38, wherein greater than a specified percentage of said financial instruments held by said investment fund are traded on one or more primary markets outside of the United States, and wherein said financial instruments trade on said primary market after receipt of said notice of commitment to create or redeem shares and before prices are determined for calculation of a net asset value of said fund shares and calculation of a value of said financial instruments.

42. The system of claim 38, further comprising a module configured to reject said received notice of commitment to create shares if said created shares would increase the fund size beyond a maximum fund size stated in terms of at least one of (i) a total number of shares of said general class of fund shares and equivalents and (ii) a total value of fund assets.

43. The system of claim 42, wherein a management fee to be paid to an investment manager of said investment fund is changed based on at least one of (i) the absolute or relative performance of said investment fund and (ii) a premium or discount from net asset value at which said fund shares trade in said secondary market.

44. A computer-based system for making markets in shares of an investment fund having (i) a portfolio comprised of any combination of financial instruments and cash and (ii) a general class of fund shares tradable in a secondary market, wherein an authorized participant at least one of creates and redeems shares of said investment fund through an exchange-traded fund share creation and redemption process governed by a set of rules, the system comprising:

a module configured to receive information that identifies a combination of financial instruments and cash to be exchanged for a specified number of shares of said general class of fund shares;

a module configured to deliver a notice of commitment to create or redeem shares of said general class of fund shares by a specified time prior to a time prices are determined for calculating a net asset value of said general class of fund shares and calculating a value of said financial instruments and cash exchangeable for a specified number of shares of said general class of fund shares; and a module configured to at least one of (i) deliver any combination of financial instruments and cash in exchange for new shares of said general class of fund shares and (ii) receive any combination of financial instruments and cash in exchange for existing shares of said general class of fund shares.

45. The system of claim 44, further comprising a module configured to receive an intra-day fund share net asset value proxy based on said fund portfolio during a trading day at a specified interval greater than a 15-second interval.

46. The system of claim 45, further comprising a module configured to receive modified supplementary net asset value proxies at more frequent intervals within said specified interval.

47. The system of claim 46, wherein said modified supplementary net asset value proxies are computed by at least one of (i) adding random values to and (ii) subtracting random values from said intra-day fund share net asset value proxy at times within said specified interval.

48. The system of claim 44, wherein said rules permit a rejection of said delivered notice of commitment to create shares if said created shares would increase the fund size beyond a maximum fund size stated in terms of at least one of (i) a total number of shares of said general class of fund shares and equivalents and (ii) a total value of fund assets; and wherein an authorized participant that redeems fund shares after said investment fund has reached said maximum fund size is permitted to re-create shares.

49. A computer-based system for trading shares of an investment fund having (i) a portfolio comprised of any combination of financial instruments and cash and (ii) a general class of fund shares tradable in a secondary market, wherein assets enter and are removed from said investment fund through an exchange-traded fund share creation and redemption process, the system comprising:

a module configured to trade one or more shares of said general class of fund shares of said investment fund on a secondary market;

a module configured to execute a trade for said one or more shares priced relative to a net asset value or net asset value proxy to be calculated and published at or after a specified time;

a module configured to determine a price for said executed trade, wherein said determined price is from a set of prices that are relative to said net asset value or said net asset value proxy, said set of prices comprising (a) a first price that is at a specified discount to said net asset value or said net asset value proxy; (b) a second price that is equal to said net asset value or said net asset value proxy; and (c) a third price that is at a specified premium to said net asset value or said net asset value proxy; and a module configured to submit said executed trade for settlement at said determined price.

50. A computer-based system for managing an investment fund having a portfolio comprised of any combination of financial instruments and cash and a general class of fund shares tradable in a secondary market, wherein assets enter and are removed from said investment fund through an exchange-traded fund share creation and redemption process governed by a set of rules, the system comprising:

a module configured to at least one of specify and deliver information consisting of a designated combination of financial instruments and cash to be exchanged for a specified number of shares of said general class of fund shares;

a module configured to receive a notice of commitment to create or redeem shares of said general class of fund shares by a specified time prior to a time prices are determined for calculating a net asset value of said general class of fund shares and calculating a value of said financial instruments and cash exchangeable for a specified number of shares of said general class of fund shares; and a module configured to at least one of (i) create shares of said general class of fund shares by receiving any combination of financial instruments and cash exchangeable for said created shares; and (ii) redeem shares of said general class of fund shares by delivering any combination of financial instruments and cash exchangeable for said redeemed shares, wherein said fund portfolio is divided into (i) one of a first segment represented by said designated financial instruments and a first segment represented by said designated financial instruments and cash and (ii) an undisclosed second segment representing any combination of long and short or short equivalent positions and cash in said fund portfolio, and wherein a long investment in appropriately sized positions in said first and second segments replicates a net asset value performance of a specified number of said general class of fund shares.

* * * * *

UNITED STATES PATENT AND TRADEMARK OFFICE
CERTIFICATE OF CORRECTION

PATENT NO. : 7,444,300 B1  Page 1 of 1
APPLICATION NO. : 11/141243
DATED : October 28, 2008
INVENTOR(S) : Broms et al.

It is certified that error appears in the above-identified patent and that said Letters Patent is hereby corrected as shown below:

<u>Column 24</u>
Line 37, please replace "find" with --fund--.

<u>Column 25</u>
Line 21, please replace "find" with --fund--.

<u>Column 25</u>
Line 37, please replace "find" with --fund--.

<u>Column 25</u>
Line 42, please replace "find" with --fund--.

<u>Column 25</u>
Line 62, please replace "find" with --fund--.

<u>Column 27</u>
Line 63, please replace "find" with --fund--.

<u>Column 30</u>
Line 54, please replace "find" with --fund--.

<u>Column 30</u>
Line 64, please replace "find" with --fund--.

<u>Column 31</u>
Line 23, please replace "find" with --fund--.

Signed and Sealed this

Twenty-fourth Day of February, 2009

JOHN DOLL
*Acting Director of the United States Patent and Trademark Office*